United States Patent
Handa et al.

(10) Patent No.: US 9,648,043 B2
(45) Date of Patent: May 9, 2017

(54) SERVICES WITHIN REVERSE PROXY SERVERS

(71) Applicant: Oracle International Corporation, Redwood Shores, CA (US)

(72) Inventors: Nitin Handa, Foster City, CA (US); Prakash Yamuna, Union City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 34 days.

(21) Appl. No.: 14/696,432

(22) Filed: Apr. 25, 2015

(65) Prior Publication Data
US 2016/0088023 A1    Mar. 24, 2016

Related U.S. Application Data

(60) Provisional application No. 62/054,613, filed on Sep. 24, 2014.

(51) Int. Cl.
*H04L 29/06* (2006.01)
*H04L 29/08* (2006.01)
*G06F 17/30* (2006.01)

(52) U.S. Cl.
CPC ........ *H04L 63/20* (2013.01); *G06F 17/30899* (2013.01); *H04L 63/0209* (2013.01);
(Continued)

(58) Field of Classification Search
CPC  H04L 63/20; H04L 67/2823; G06F 17/30899
(Continued)

(56) References Cited

U.S. PATENT DOCUMENTS 8,095,670 B2 *  1/2012  Brown ................... G06Q 30/02
                                                    709/217
8,472,987 B2 *  6/2013  Bhatnagar ........... H04L 12/5855
                                                    455/466
(Continued)

FOREIGN PATENT DOCUMENTS

WO    2016048418    3/2016
WO    2016048419    3/2016

OTHER PUBLICATIONS

Anonymous: "Membrane Service Proxy documentation—Open Source Reverse Proxy for SOAP & REST-Membrane", Dec. 2, 2013, accessed on Dec. 9, 2015, retrieved from the internet: <URL:https://web.archive.org/web/20131202035553/http://www.membrane-soa.org/service-proxy/>.
(Continued)

Primary Examiner — Mahfuzur Rahman
(74) Attorney, Agent, or Firm — Kilpatrick Townsend & Stockton LLP

(57) ABSTRACT

Embodiments of the invention provide techniques for processing messages transmitted between computer networks. Messages, such as requests from client devices for web services and other web content may be transmitted between multiple computer networks. Intermediary devices or applications such as proxy servers may receive, process, and transmit the messages between the communication endpoints. In some embodiments, a reverse proxy server may be configured to dynamically generate Representational State Transfer (REST) services and REST resources within the reverse proxy server. The REST services and REST resources within the reverse proxy server may handle incoming requests from client devices and invoke backend web services, thereby allowing design abstraction and/or
(Continued)

enforcement of various security policies on the reverse proxy server.

30 Claims, 12 Drawing Sheets

(52) U.S. Cl.
CPC ........ *H04L 63/0281* (2013.01); *H04L 63/083* (2013.01); *H04L 63/105* (2013.01); *H04L 65/105* (2013.01); *H04L 67/02* (2013.01); *H04L 67/28* (2013.01); *H04L 67/2823* (2013.01)

(58) Field of Classification Search
USPC .......................................................... 726/1
See application file for complete search history.

(56) References Cited

U.S. PATENT DOCUMENTS

| 8,856,735 | B2* | 10/2014 | Nimashakavi ................ 717/106 |
| 9,189,244 | B2* | 11/2015 | McMahon |
| 2003/0037097 | A1 | 2/2003 | Meyer et al. |
| 2004/0177147 | A1 | 9/2004 | Joshi et al. |
| 2004/0205781 | A1 | 10/2004 | Hill et al. |
| 2008/0140857 | A1* | 6/2008 | Conner ................ G06Q 10/00 709/236 |
| 2008/0155250 | A1 | 6/2008 | Tanizawa et al. |
| 2010/0146600 | A1 | 6/2010 | Eldar et al. |
| 2011/0041171 | A1 | 2/2011 | Burch et al. |
| 2011/0161477 | A1 | 6/2011 | Kowalski |
| 2012/0210335 | A1* | 8/2012 | Salt .......................... G06F 9/541 719/315 |
| 2014/0133489 | A1 | 5/2014 | Bae |
| 2014/0341109 | A1 | 11/2014 | Cartmell et al. |
| 2015/0163251 | A1 | 6/2015 | Kassaei et al. |
| 2016/0088022 | A1 | 3/2016 | Handa et al. |

OTHER PUBLICATIONS

Anonymous: "Membrane Service Proxy documentation—Open Source Reverse Proxy for SOAP & REST-Exposing SOAP Services as REST Resources", Dec. 28, 2013, accessed on Dec. 9, 2015, retrieved from the internet: <URL:https://web.archive.org/web/20131228213248/http://www.membrane-soa.org/service-proxy-doc/4.0/rest2soap-gateway.htm/>.
Hadley, Marc: "Web Application Description Language (WADL)", Feb. 2, 2009, accessed on Dec. 9, 2015, retrieved from the internet: <URL: https://wadl.java.net/wadl20090202.pdf >.
Rodriguez, Alex: "RESTful Web Services: The basics", IBM Developerworks, Nov. 6, 2008, retrieved from the internet: <URL:http://download.boulder.ibm.com/ibmdl/pub/software/dw/webservices/ws-restful/ws-restful-pdf.pdf>.
Saini, Kulbir, "Squid Proxy Server 3.1, Beginners Guide", Feb. 1, 2011 (Feb. 1, 2011), accessed on Dec. 9, 2015, retrieved from the internet: <URL: http://gocit.vn/files/Squid.Proxy.Server.3.1.Beginners.Guide-www.gocit.vn.pdf>.
International Search Report and Written Opinion for international patent application No. PCT/US15/27757, mailed on Jul. 30, 2015, all pages.
International Search Report and Written Opinion for international patent application No. PCT/US2015/027763, mailed on Jul. 30, 2015, all pages.
International Application No. PCT/US2015/027757, International Preliminary Report on Patentability mailed on Sep. 5, 2016, 7 pages.
U.S. Appl. No. 14/696,186, Non-Final Office Action mailed on Aug. 25, 2016, 35 pages.

* cited by examiner

SERVICES WITHIN REVERSE PROXY SERVERS

RELATED APPLICATIONS

The present application claims priority under 35 U.S.C. §119(e) to U.S. Provisional Patent Application No. 62/054,613, filed Sep. 24, 2014, entitled "MOBILE SECURITY ACCESS SERVER (MSAS)," the entire contents of which are incorporated herein by reference for all purposes.

BACKGROUND

The present disclosure relates generally to systems, methods and computer-readable media for providing security across computer networks. More particularly, this disclosure relates to systems, methods and computer-readable media for providing security services and other functionality at a proxy server implemented between client devices and backend web applications and services. Such security services may include authentication, authorization, auditing, single sign on, security policy enforcement, key management and distribution, secure communication, secure data storage, and secure data sharing, among others.

BRIEF SUMMARY

Aspects described herein provide various techniques for processing messages transmitted between computer networks. In some embodiments, messages such as requests from client devices for backend web services, applications, and other web content may be transmitted between multiple computer networks. One or more intermediary devices or applications, such as proxy servers implemented within a physical or logical subnetwork, may receive, process, and transmit the messages between the communication endpoints. In some embodiments, a reverse proxy server may be configured to dynamically generate Representational State Transfer (REST) services and REST resources within the reverse proxy server. The REST services and REST resources within the reverse proxy server may handle incoming requests from client devices and invoke backend web services, thereby allowing design abstraction and/or enforcement of various security policies on the reverse proxy server.

According to certain aspects described herein, a proxy server may receive a web service request for a specific resource exposed by a REST web service within the proxy server. The appropriate resource within the REST web service in the proxy server may be invoked, and may in turn invoke a backend web service. In some cases, a reverse proxy server may expose a set of REST web services which virtualize and obscure various backend web services. For instance, the reverse proxy server may expose only virtual uniform resource locators (URLs) so that client devices on untrusted networks might not see or have knowledge of the underlying backend web services.

According to additional aspects described herein, REST services and REST resources may be generated within the reverse proxy server to handle some or all of the REST requests received from client devices. These REST services/resources may be dynamically generated and configured to handle REST requests within the reverse proxy server, and/or to invoke corresponding sets of backend web services. In order to dynamically generate and manage REST web services/resources, a REST infrastructure and/or a REST application engine may be implemented within the reverse proxy server. Additionally, in some embodiments, REST resources within the reverse proxy server may generate and provide backend web service calls to a policy enforcement engine for enforcing various policies.

DETAILED DESCRIPTION

Figure 1:
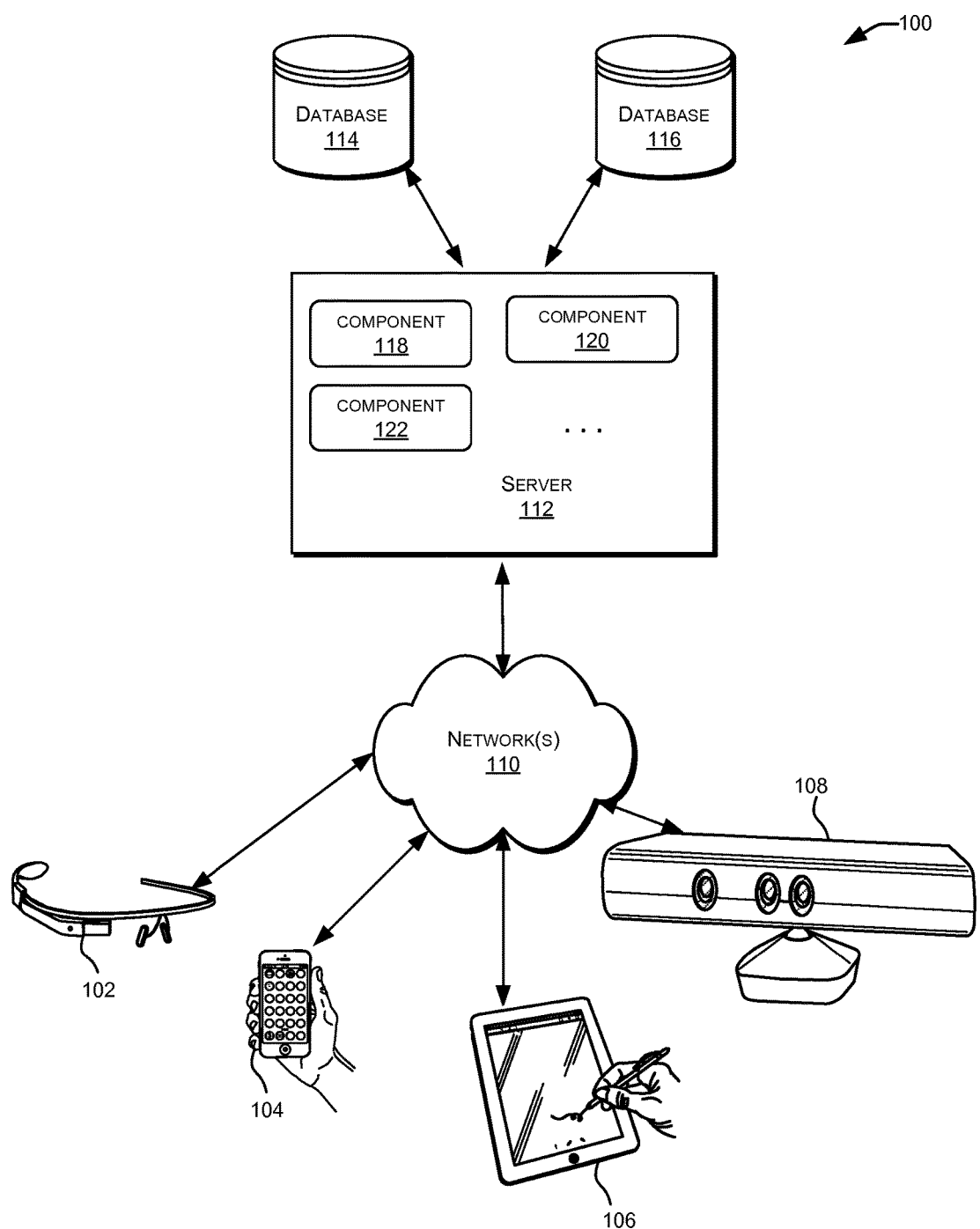
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to non-transitory media such as portable or fixed storage devices, optical storage devices, and various other mediums capable of storing, containing or carrying instruction(s) and/or data. A code segment or computer-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various techniques (e.g., methods, systems, non-transitory computer-readable storage memory storing a plurality of instructions executable by one or more processors, etc.) are described herein for processing messages transmitted between computer networks. In some embodiments, messages such as requests from client devices for backend web services, applications, and other web content may be transmitted between multiple computer networks. One or more intermediary devices or applications, such as proxy servers implemented within a physical or logical subnetwork, may receive, process, and transmit the messages between the communication endpoints. In some embodiments, a reverse proxy server may be configured to dynamically generate Representational State Transfer (REST) services and REST resources within the reverse proxy server. The REST services and REST resources within the reverse proxy server may handle incoming requests from client devices and invoke backend web services, thereby allowing design abstraction and/or enforcement of various security policies on the reverse proxy server.

In some embodiments, a proxy server may receive a web service request for a specific resources exposed by a REST web service within the proxy server. The appropriate resource within the REST web service in the proxy server may be invoked, and may in turn invoke a backend web service. In some cases, a reverse proxy server may expose a set of REST web services which virtualize and obscure various backend web services. For instance, the reverse proxy server may expose only virtual uniform resource locators (URLs) so that client devices on untrusted networks might not see or have knowledge of the underlying backend web services. According to additional aspects, REST services and REST resources may be generated within the reverse proxy server to handle some or all of the REST requests received from client devices. These REST services/resources may be dynamically generated and configured to handle REST requests within the reverse proxy server, and/or to invoke corresponding sets of backend web services. In order to dynamically generate and manage REST web services/resources, a REST infrastructure and/or a REST application engine may be implemented within the reverse proxy server. Additionally, in certain embodiments, REST resources within the reverse proxy server may generate and provide backend web service calls to a policy enforcement engine for enforcing various policies.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
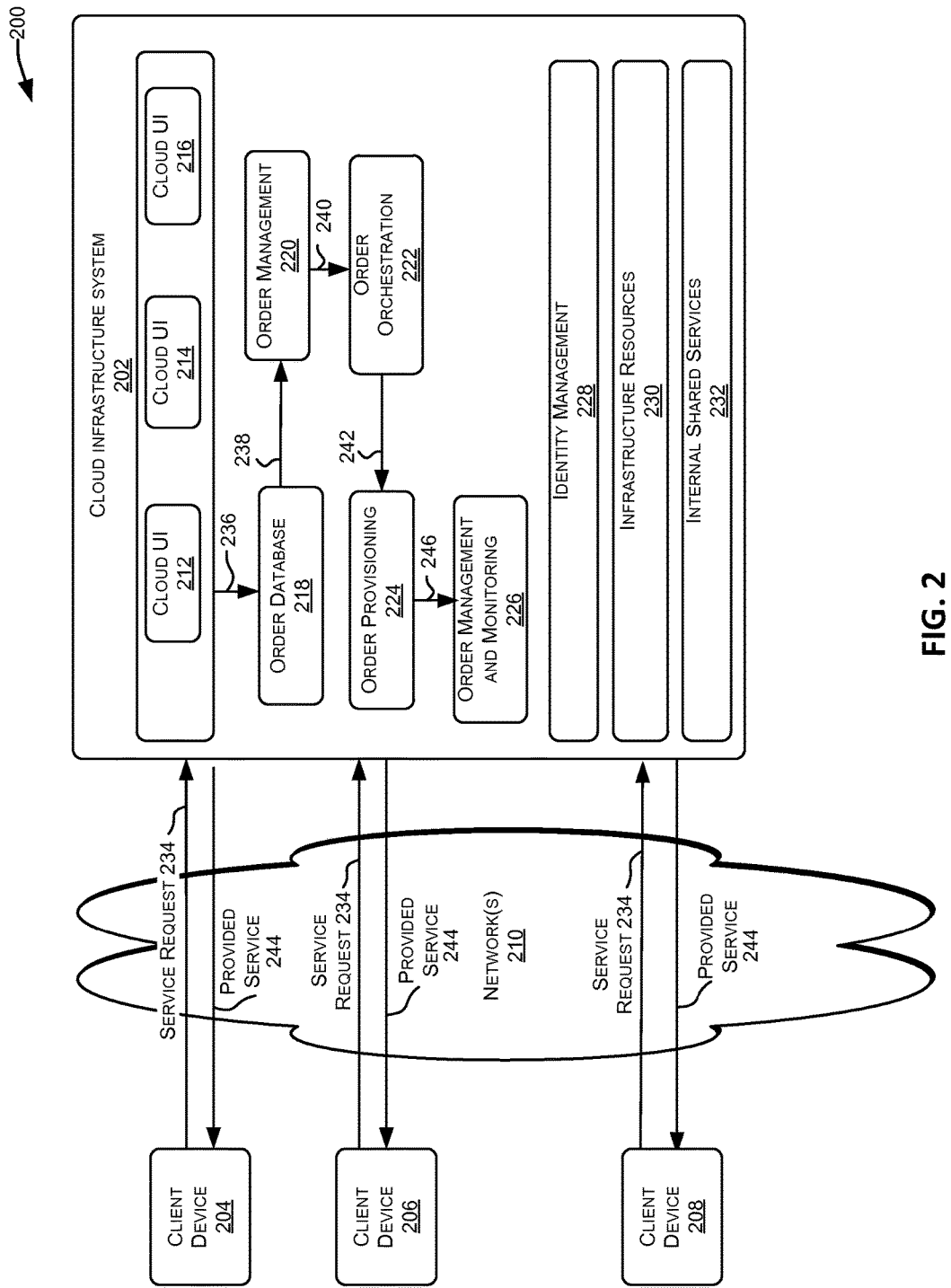
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
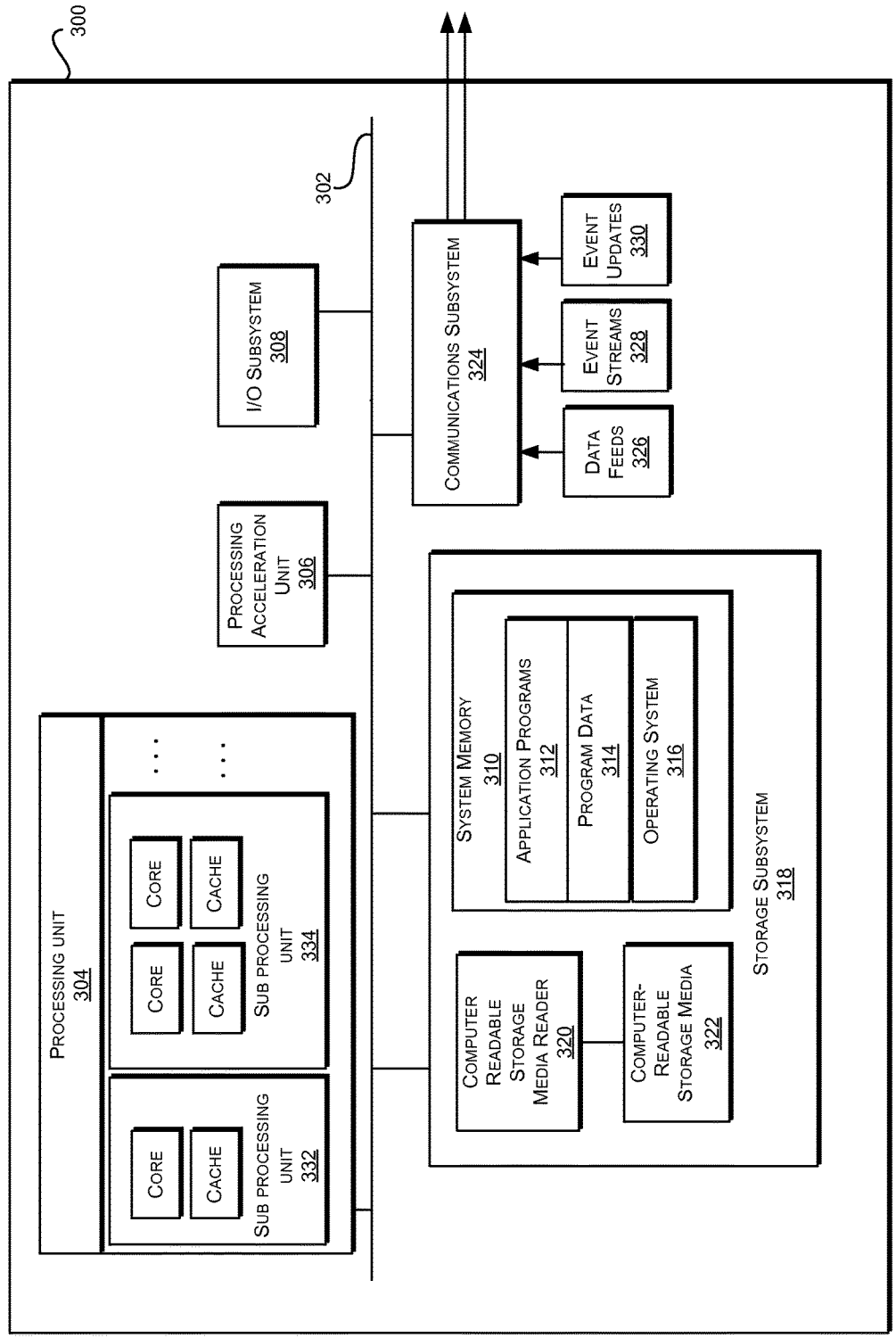
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include non-transitory and tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3 G, 4 G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

As introduced above, embodiments of the invention provide techniques for processing messages transmitted between computer networks. More specifically, intermediary network devices or applications, such as proxy servers implemented within a physical or logical subnetwork, may receive, process, and transmit the messages between the communication endpoints. In some embodiments, a reverse proxy server may be configured to dynamically generate Representational State Transfer (REST) services and REST resources within the reverse proxy server. The REST services and REST resources within the reverse proxy server may handle incoming requests from client devices and invoke backend web services, thereby allowing design abstraction and/or enforcement of various security policies on the reverse proxy server.

In various embodiments, a proxy server may receive a web service request for a specific resources exposed by a REST web service within the proxy server. The appropriate resource within the REST web service in the proxy server may be invoked, and may in turn invoke a backend web service. In some cases, a reverse proxy server may expose a set of REST web services which virtualize and obscure various backend web services. For instance, the reverse proxy server may expose only virtual uniform resource locators (URLs) so that client devices on untrusted networks might not see or have knowledge of the underlying backend web services. According to additional aspects, REST services and REST resources may be generated within the reverse proxy server to handle some or all of the REST requests received from client devices. These REST services/resources may be dynamically generated and configured to handle REST requests within the reverse proxy server, and/or to invoke corresponding sets of backend web services. In order to dynamically generate and manage REST web services/resources, a REST infrastructure and/or a REST application engine may be implemented within the reverse proxy server. Additionally, in certain embodiments, REST resources within the reverse proxy server may generate and provide backend web service calls to a policy enforcement engine for enforcing various policies.

Figure 4A:
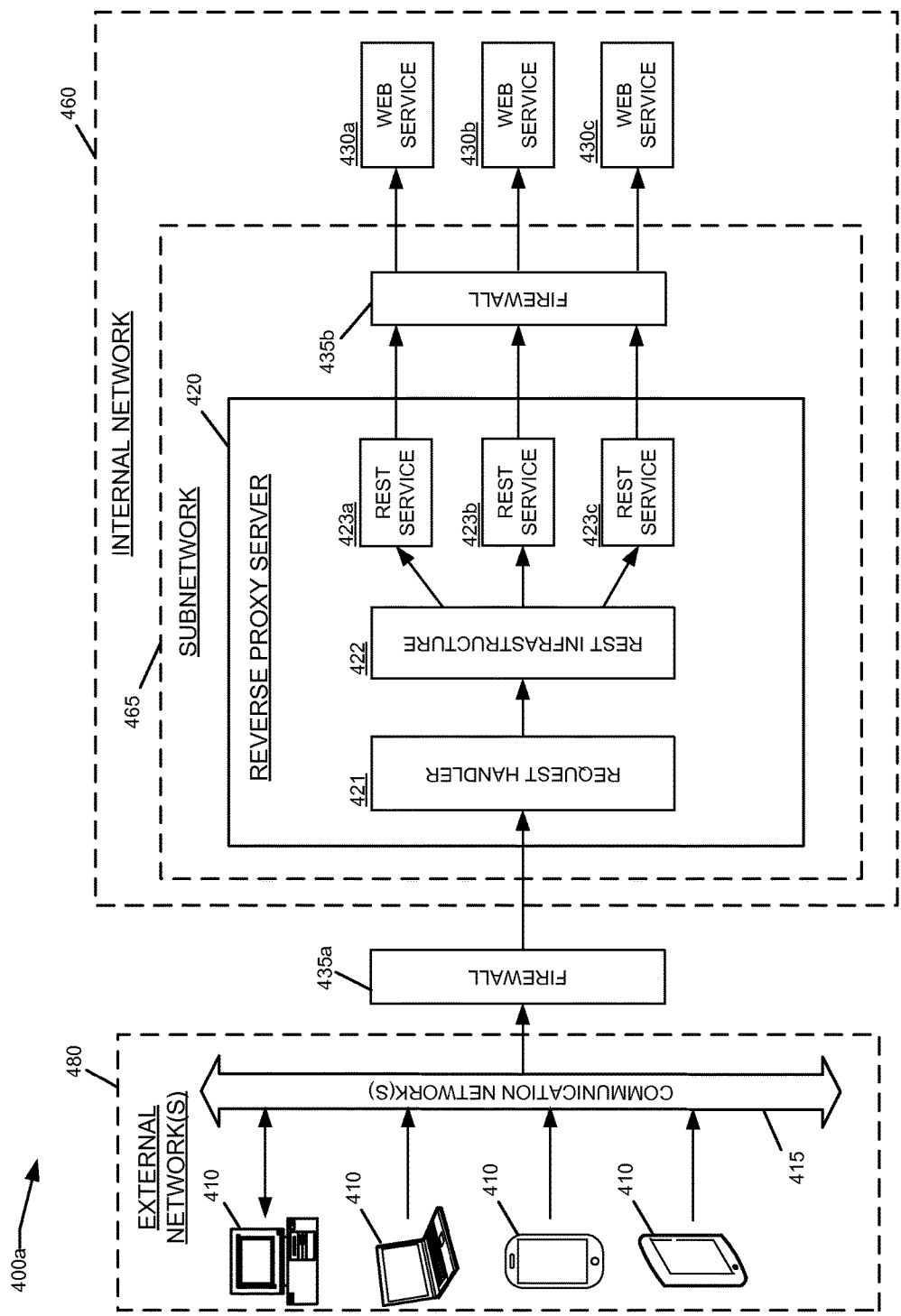
FIGS. 4A and 4B are block diagrams illustrating, at a high-level, examples of computing environments including a reverse proxy server for processing and transmitting messages between computing devices and/or systems, according to one or more embodiments of the present invention.
Figure 4B:
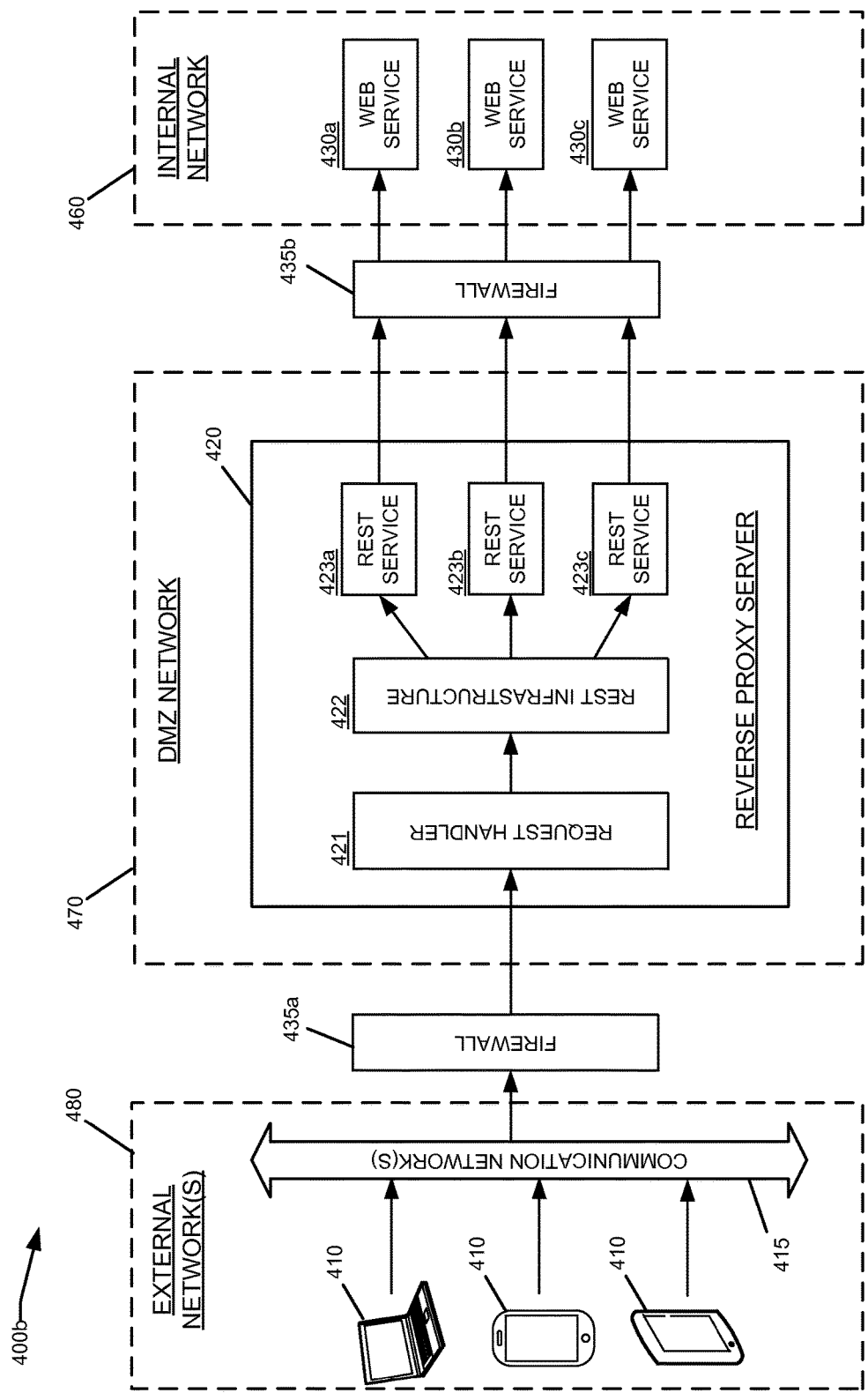

FIGS. 4A and 4B are block diagrams illustrating components of computing environments 400a and 400b that include a reverse proxy server 420 for processing and transmitting messages between computing devices and/or systems in various computer networks. Computing environments 400a and 400b (collectively, 400) illustrated in this example may correspond to a high-level computer architecture designed to provide various client devices 410 with access to backend computing resources such as web applications and web services 430. In various embodiments, computing environment 400 may range from a small and simple computing system to a large and highly complex system including hardware, software, and network components designed to integrate with other such systems to support the computing needs of various organizations. The computing environment 400 may be implemented as a multi-tier computer architecture, which may include web-based and/or cloud-based implementations, and in which various endpoint devices (e.g., user devices 410, web service providers 430, etc.) interact via one or more middle-tier systems. Additionally, each component shown in computing environment 400 may be implemented as an individual computer system including various combinations of hardware, software, and/or network components. In other cases, multiple components shown in computing environment 400 may be implemented as logical subcomponents (e.g., software applications embodied on computer-readable media, etc.) operating within combined computer systems.

As shown in FIGS. 4A and 4B, such computing environments 400 may correspond to a client-server system in which client devices 410 may transmit requests via one or more computer network(s) 415, one or more firewalls 435, reverse proxy server 420, and/or other intermediary network devices, to one or more backend web services 430. Web services 430 may include any application programming interfaces (APIs), services, applications, and any other information assets exposed by the various systems 430, including but not limited to Simple Object Access protocol (SOAP) web services or APIs, Representational State Transfer (REST) web services or APIs, and/or web content exposed via Hypertext Transfer Protocol (HTTP) or HTTP Secure protocols. In such cases, the reverse proxy server 420 may provide a security layer between the client devices 410 and backend web services 430. For example, proxy server 420 may provide a central access point for the backend web services 430, along with service virtualization and enforcement of various security and management policies associated with the backend web services 430. Reverse proxy server 420 also may expose the backend web services 430 while virtualizing and obscuring these services 430. For instance, the reverse proxy server 420 may expose only virtual uniform resource locators (URLs) so that client devices 410 on untrusted networks might not see or have knowledge of the underlying backend web services 430.

Additionally or alternatively, computing environments 400 may be configured as a client-server system for processing and transmitting requests-responses in the opposite direction. For example, in some embodiments, one or more client devices (not shown) operating within the internal computer network 460 may transmit requests to web services or applications (not shown) operating on various external computer systems and networks 480 beyond the proxy server 420 and firewall(s) 435a. Thus, although server 420 is referred to herein as a reverse proxy server 420, it should be understood that it also may act as a forward proxy server, and may provide a security layer between internal client devices 440 and external backend web services or applications. When performing either the functionality of a reverse proxy (i.e., reverse proxy mode) or the functionality of a forward proxy (i.e., forward proxy mode), the reverse proxy server 420 may handle network requests to and responses from SOAP web services, REST web services, HTTP/HTTPS web content, and the like. When the proxy server 420 is operating as a forward proxy server, the internal client devices may already know about the external backend web services/applications, and those backend services/applications may receive direct transmissions from the proxy server 420 configured on the client side. In such cases, the proxy server 420 may provide security for the forward proxy uniform resource identifier (URI) endpoints, using any security or communication management policies. In either forward proxy mode or reverse proxy mode, the proxy server 420 may support various security and authentication features, such as Kerberos Kinit-based authentication, Kerberos Pkinit-based authentication, open standard for authorization protocol version 2.0 (OAuth2) based authentication, TLP-based authentication, create session tokens and/or challenge-based authentication of backend services using Simple and Protected GSSAPI Negotiation Mechanism (SPNEGO) tokens, WINDOWS NT LAN Manager (NTLM) tokens, Security Assertion Markup Language (SAML) tokens, and the like.

Client devices 410 may include desktop or laptop computers, mobile devices, and other various computing devices/systems, including some or all of the hardware, software, and networking components discussed above in the illustrative computing systems in FIGS. 1-3. In some embodiments, client devices 410 may include one or more client software applications (e.g., web browsers) configured to request and receive data from the backend web services 430. Client devices 410 also may include the necessary hardware and software components to establish the network interfaces, security and authentication capabilities, and content caching capabilities to receive the live content and provide it to users in real-time (or near real-time).

Communication networks 415 may include any combination of computer networks and other communication networks described herein. For example, networks 415 may include TCP/IP (transmission control protocol/Internet protocol) networks such as local area networks (LANs), wide area networks (WANs) (e.g., the Internet), and various wireless telecommunications networks. Additionally, it should been understood that communication network 415 may represent combinations of many different physical and logical networks separating client devices 410 from backend web services 430. In addition to one or more firewalls 435, various servers such as web servers, authentication servers, and/or specialized networking components, such as firewalls, routers, gateways, load balancers, and the like, may facilitate communication between client devices 410 and backend web services 430.

In some embodiments reverse proxy server 420 may be implemented as isolated computer system (e.g., a proxy computer server) or as combination of computer multiple computing systems including specialized hardware, software, and network components within an isolated DMZ 470, as shown in FIG. 4B. Alternatively or additionally, reverse proxy server 420 may be a proxy server software application executing within a network device (e.g., a web server or firewall 435b) or a computer server within a trusted network 460. Thus, reverse proxy server 420 may reside in physical or logical subnetwork 465 of the internal computer network 460, as shown in FIG. 4A. In either case, the reverse proxy server 420 may act as an intermediary between clients/servers on a trusted internal network 460 and clients/servers on untrusted external networks 480. Additionally, each of the components 421-423 within the reverse proxy server 420 (as well as other the proxy server components discussed in reference to FIGS. 5, 7, and 9) may be implemented as separate computing systems configured to communicate with reverse proxy server 420, or may operate as logical subcomponents integrated within the same computer server as the reverse proxy server 420. In either case, each component 421-423 (as well as other the proxy server components discussed in reference to FIGS. 5, 7, and 9) may be implemented using specialized hardware, software, network, and memory subsystems to perform the techniques described herein.

In this example, reverse proxy server 420 includes a message handler 421 configured to receive messages from client devices 410 via communication networks 415 and/or firewalls 435a. In some embodiments, message handler 421 may be entry point for all TCP, UDP, HTTP, and HTTPS traffic from any external networks to the backend web services 430. Message handler 421 also may be configured to receive response from backend web services 430, and transmit the responses to the client devices 410. In some examples, the message handler 421 may include one or more specialized hardware, software, and network components such as load balancers, caches, and/or message throttlers.

After receiving and parsing messages, message handler 421 may transmit the messages (e.g., via Java Native Interface (JNI) or .NET programming framework, etc.) to an appropriate web services framework. For example, SOAP requests received at the reverse proxy server 420 may be transmitted to a SOAP web services framework (not shown), while REST requests may be transmitted to a REST web services framework (e.g., REST infrastructure 422). Web content requests may be handled similarly by the message handler 421, for example, by parsing and transmitting the requests to various components, such as URL virtualization component or service. In some cases, the message handler 421 also may be configured to perform protocol transformations, such as SOAP to REST and REST to SOAP message transformations, as well as JavaScript Object Notation (JSON) to XML or JSON to SOAP, and vice versa.

Proxy server 420 also may include a Representational State Transfer (REST) infrastructure 422 and one or more REST web services (or REST APIs) 423. As shown in FIG. 4, the REST infrastructure 422 may receive requests for REST web services from the request handler 421. As described below in more detail, the REST infrastructure 422 may analyze and process REST requests before forwarding them to the appropriate REST service 423 to handle the request. Each REST service 423 may include REST resources configured to handle requests and invoke corresponding backend web services 430 based on the request. Additionally, in some embodiments, the REST infrastructure 422 may dynamically generate the REST services 423 and individual REST resources to handle requests.

REST infrastructure 422 may include a web services framework for developing and executing REST web services (also called RESTful web services, RESTful APIs, etc.). In some embodiments, the REST infrastructure 422 may be an implementation of the JAX-RS (The Java API for RESTful Web Services) specification, such as the JERSEY reference implementation of JAX-RS. Although many examples below are discussed in terms of JAX-RS and the JERSEY web service/API infrastructure, other frameworks and techniques may be used in other examples. For example, other REST web frameworks/API servers such as SCALA, BOWLING FINCH/FINAGLE frameworks may be used alternatively or in addition to JERSEY and JAX-RS.

In various embodiments, the REST infrastructure 422 may include a library to implement REST web services (e.g., within a JERSEY JAVA servlet container), and also may provide an application (e.g., a JERSEY JAVA servlet) configured to scan predefined classes to identify REST resources. The REST infrastructure 422 also may provide a client library to communicate with REST web services 423 and/or 430. When receiving requests from client devices, an application within the REST infrastructure (e.g., a JERSEY JAVA servlet) may analyze incoming HTTP requests and select the correct resource and method to respond to the request. Unlike certain types of web services, REST web services need not communicate in XML or any other particular data format. Accordingly, the REST infrastructure 422 may support creation of data in XML, JavaScript Object Notation (JSON), comma-separated values (CSV), or a variety of other data formats.

As shown in FIGS. 4A and 4B, reverse proxy server 420 may be implemented within an intermediary network device between two or more computer networks, for example, between a trusted internal network 460 providing web services 430, and untrusted external networks 480 (e.g., the Internet) over which various untrusted client devices 410 may access the internal web services 430. As shown in FIG. 4A, reverse proxy server 420 may operate within a subnetwork 465 of an internal computer network 460, in order to provide an initial layer of security and communications management for the internal computer network 460. For example, a secure internal network 460 may include a plurality of web services and applications 430, along with various other servers and/or client devices. Reverse proxy server 420 and/or additional network or computing devices may be part of the same internal network 460, but may operate within a physical subnetwork 465 of the internal computer network, separated from the internal computer network by one or more gateways, firewalls 435b, etc. In some examples, reverse proxy server 420 may be implemented as a proxy server application executing within a logical subnetwork 465 (but not a physical subnetwork) of the internal computer network 460. Thus, reverse proxy server 420 may reside on the same computing systems one or more of the backend web services 430 or other computer systems within the internal computer network 460.

Additionally, in some embodiments, the reverse proxy server 420 may operate within a demilitarized zone (DMZ) network 470 between a trusted internal network 460 and an untrusted external network 480. As shown in FIG. 4B, the DMZ network 470 may be implemented as a wholly separate computing system, with dedicated hardware, software, and network components, and isolated from both the internal network 460 and the external network 480. Alternatively, as shown in FIG. 4A, the DMZ may be implemented as a physical or logical subnetwork 465 of the trusted internal network 460, whereby the DMZ provides a first layer of security and communications management, separate from the endpoint security provided at client devices 410 and/or backend web services 430. In either case, a DMZ network may be implemented between two firewalls 435a and 435b, or may be implemented using a single firewall, or using other various configurations of network devices that physically or logically separate a DMZ network 470 or a subnetwork 465, both from the trusted internal network 460 and the untrusted external network 415. All computer servers and other devices within the DMZ, such as the reverse proxy server 420, may have limited connectivity to a specific subset of the devices within the internal network 460 (e.g., specific servers hosting web services 430). Such connectivity may be limited based on the specific hosts, ports, protocols, and the like. Similarly, policies of limited connectivity may be enforced on the devices within the DMZ when communication with any external untrusted network (e.g., network 415 and client devices 410). In addition to operating a reverse proxy server 420 within a DMZ, in certain embodiments, one or more of the backend web services 430 may operate within a DMZ. For instance, certain computer servers/services that are more vulnerable or prone to attacks from external systems (e.g., web servers, email servers, Domain Name System (DNS) servers, etc.) may be moved into the DMZ with the proxy server 420.

Figure 5:
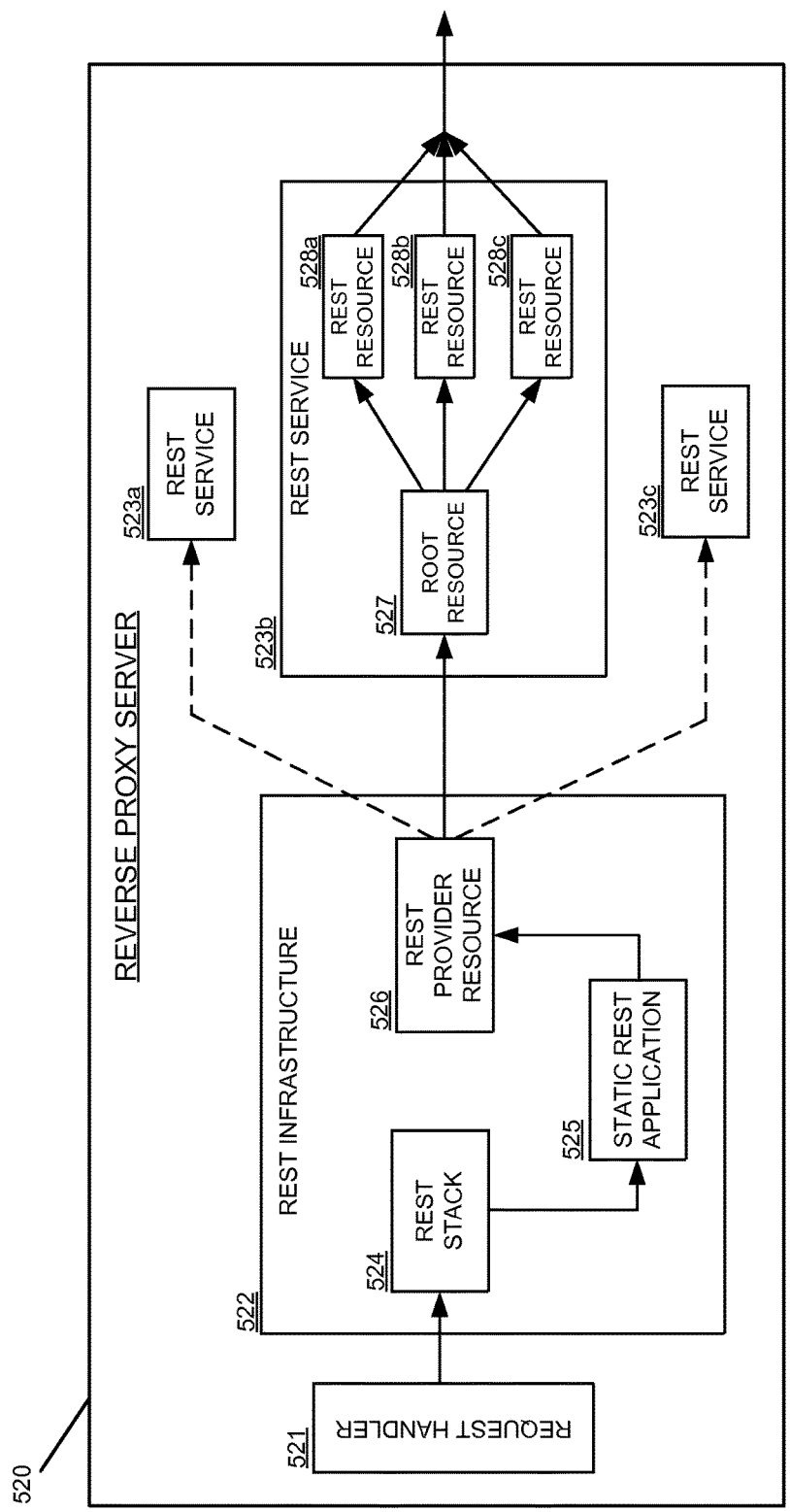
FIG. 5 is another block diagram illustrating, at a high-level, a reverse proxy server for receiving and processing REST requests, according to one or more embodiments of the present invention.

FIG. 5 is a block diagram illustrating certain elements and systems of a reverse proxy server according to one or more embodiments. The reverse proxy server 520 in this example may correspond to reverse proxy 420, and the various subcomponents 521-523 of the reverse proxy server 520 may be similar or identical to the corresponding subcomponents 421-423, discussed above. Additionally, reverse proxy server 520 may operate within computing environment 400 or other similar environments, and may be configured to process and transmit messages between client computing devices and backend web services. Accordingly, reverse proxy server 520 may include some or all of the hardware, software, and networking components and functionality discussed above in reference to FIGS. 4A and 4B.

REST infrastructure 522 may include one or more REST web service frameworks having various components (e.g., applications and libraries) for developing, deploying, executing, and accessing REST services and resources. In various embodiments, the REST infrastructure 522 may include to a JERSEY implementation of the JAX-RS specification and/or other REST web service framework implementations. The REST infrastructure 522 may provide one or more libraries to implement REST web services, applications to scan predefined classes to identify REST resources, and client libraries to communicate with REST web services, etc.

As discussed above, request handler 521 may forward REST requests to the REST infrastructure 522, which may analyze and process the requests before forwarding them to one or more REST services within the reverse proxy server 520. In this example, the REST infrastructure 522 includes a REST stack 524, a static REST application 525 (e.g., a JERSEY application generated during build-time), and a REST provider resource 526. As discussed in more detail below, the reverse proxy server 520 may dynamically (i.e., during runtime) initialize the REST stack 524 and register the static REST application 525. The static REST application 525 may return a REST provider resource 526 which may be responsible for identifying the root resource of the appropriate REST service 523 to handle the request.

As shown in FIG. 5, the REST provider resource 526 may forward requests to any REST service 523 within the reverse proxy server 520. In this example, the request has been forwarded to REST service 523b, and received by the root resource 527 in that REST service. As shown in this example, REST services 523 may be designed and implemented as resource hierarchies, in which a root resource 527 is the highest-level resource within the service 523 (e.g., mapped the "/" path of the service) and is responsible for identifying the sub-resources 528 (or child resources) that will handle the different requests. Both the root resource 527 and/or all of the child resources 528 may be created as dynamic REST resources (e.g., resources created during runtime), as discussed below in more detail. Additionally, although a simple two-level hierarchy is shown in this example, complex hierarchies of many different levels (e.g., three-level, four-level, five-level, etc.) may be implemented in other examples.

Figure 6A:
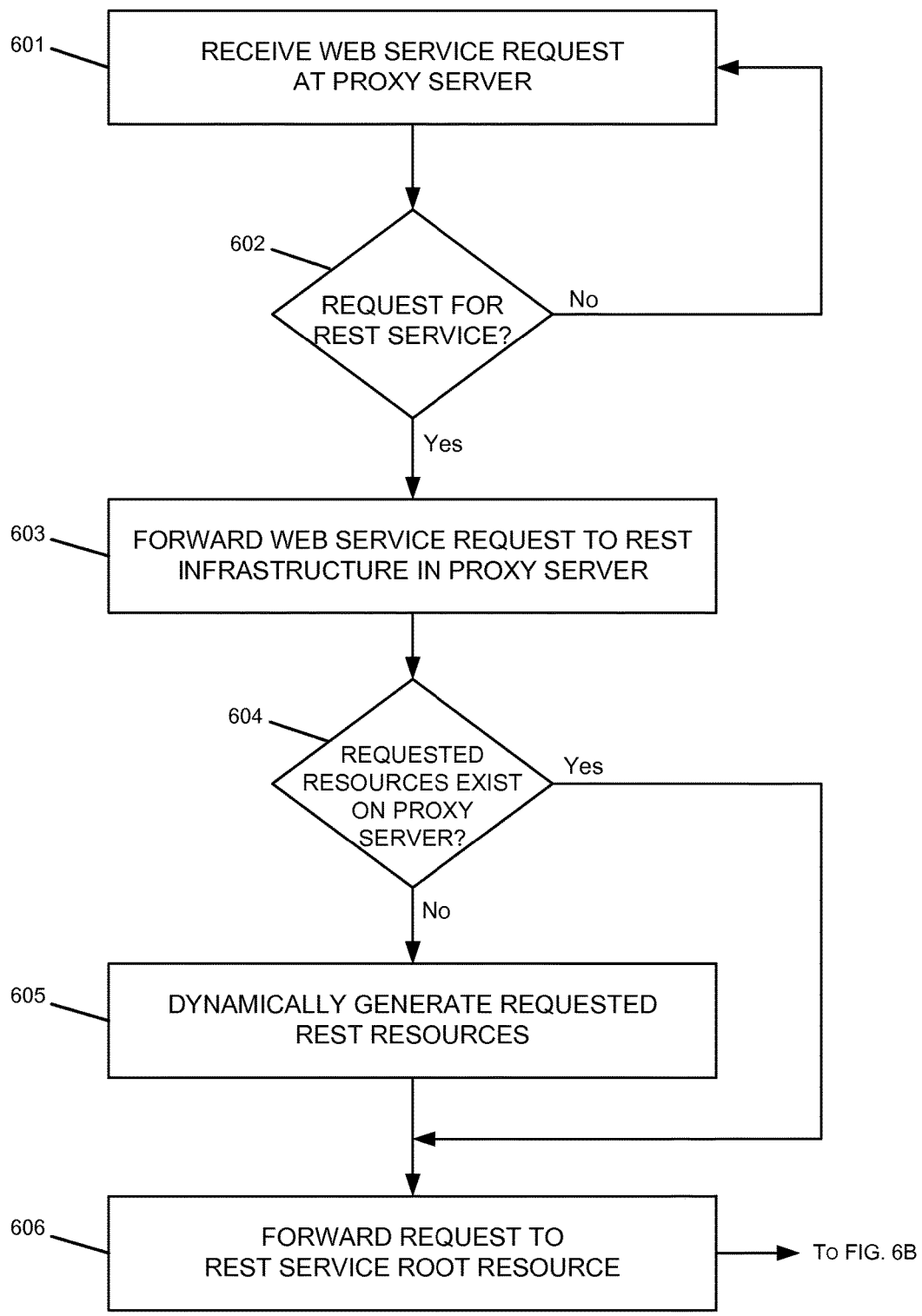
FIGS. 6A-6B are a flowchart illustrating a process for receiving and processing receiving and processing REST requests from client devices, and determining and invoking backend web services, according to one or more embodiments of the present invention.
Figure 6B:
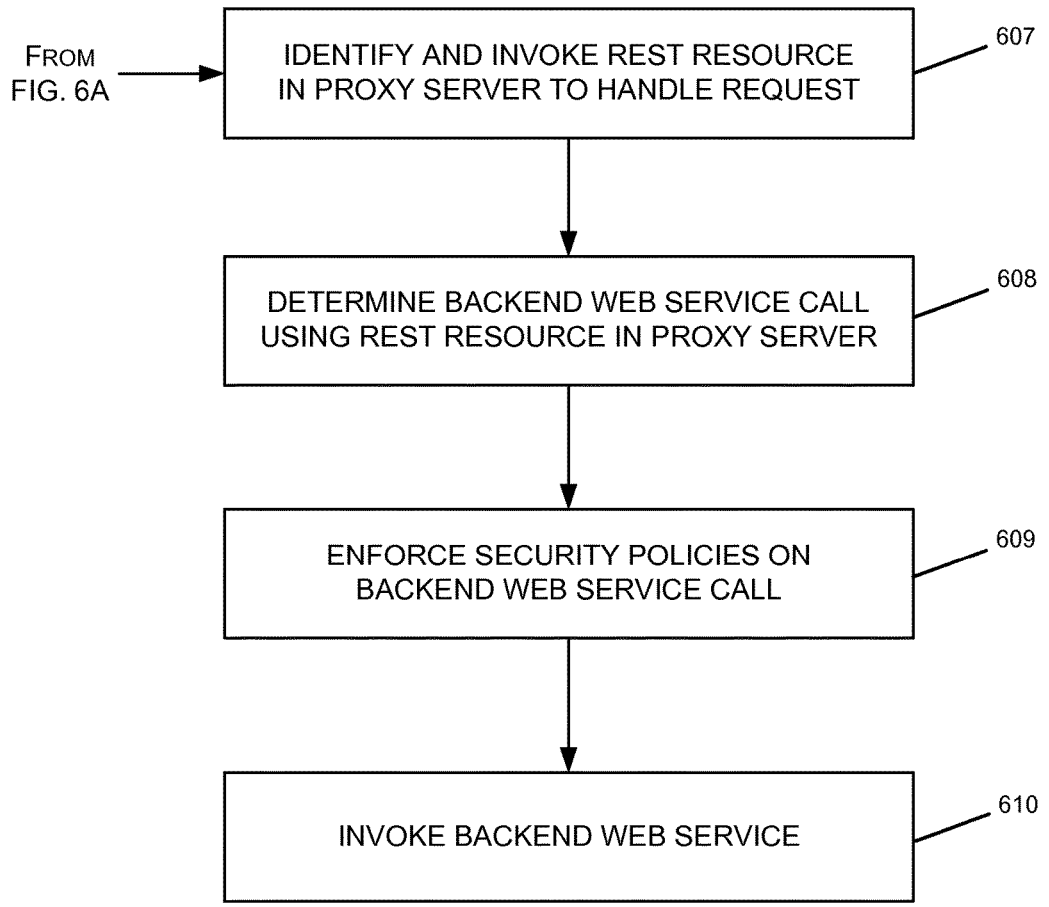

Referring now to FIGS. 6A-6B (collectively "FIG. 6"), a flowchart is shown illustrating a process for receiving and processing REST web service requests via reverse proxy servers. As described below, the steps in this process may be performed by one or more components in the computing environment 400, such as reverse proxy server 420 (and/or reverse proxy servers 520, 720, and 920), and the various subsystems and subcomponents implemented therein. Additionally, in some embodiments, certain steps in this process may be performed within client devices 410, backend web services 430, and/or by other various intermediary devices. It should further be understood that the techniques described herein, including receiving and analyzing messages, selecting message processing policies and processing messages, need not be limited to the specific system and hardware implementations described above, but may be performed within other hardware and system environments comprising other combinations of the hardware, software, and network components.

In step 601, a web service request may be received by an intermediary computing system or application, such as reverse proxy server 420. As noted above, reverse proxy server 420 may be implemented as an intermediary server device and/or application between a trusted internal network 460 and one or more untrusted external networks. Therefore, the reverse proxy server 420 may intercept messages transmitted by client endpoints (e.g., client devices 410) and intended for server endpoint devices (e.g., computer server hosting backend web services and/or applications 430), or vice versa.

In some embodiments, all network traffic entering or leaving an internal network 460 may be routed through the reverse proxy server 420. In other cases, the reverse proxy server 420 may be configured to intercept specific types or protocols of network messages, for example, HTTP requests from client devices 410 for SOAP, REST, or URL resources, and HTTP responses from SOAP, REST, or URL web services/applications 430 back to the client devices. Therefore, the web service request received in step 601 may be, for example and without limitation, a TCP message, an HTTP or HTTPS message, a Simple Mail Transport Protocol (SMTP), a User Datagram Protocol (UDP) message, and/or a Java Message Service (JMS) message. In some cases, the web service request may correspond to a SOAP, REST, or web content request from a client device 410 to a backend web service 430, or to response by a backend web service 430 to a SOAP, REST, or web content request from a client device 410.

In step 602, the reverse proxy server 420 may analyze the request received in step 601 to determine whether or not the request is directed to a REST resource 528 exposed by a REST service 423/523 within the reverse proxy server 420. As used herein, "exposing" a resource such as programming object or a data object may refer to providing an interface that provides access to the resource. For example, web services and APIs may expose resources by providing methods and operations that allow client applications to access and/or manipulate the objects.

As discussed above, the REST web service request received in step 601 may be intended for (and/or may be ultimately forwarded to) a backend web service 430. However, in various embodiments, REST services and resources may be generated within the reverse proxy server 420 to handle some or all of the REST requests received from client devices 410. For example, as shown in FIGS. 4A and 4B, a set of a REST services 423 may be generated to handle REST requests in the reverse proxy server 420, and potentially may invoke a corresponding set of backend web services 430. Thus, a set of REST services 423/523 within the reverse proxy server 420 may expose some or all of the same resources exposed by the backend web services 430. In some cases, these REST services 423 within the reverse proxy server 420 may be referred to as "virtual services." As described below in more detail, these REST services 423 may or may not correspond precisely to the backend web services 430. For instance, a single REST service 423 may expose REST resources 528 that invoke multiple different backend services 430, or conversely, multiple different REST services 423 may invoke the same backend service 430. Additionally, the REST services 423 within reverse proxy server 420 may include support for new or different operations or methods, parameters, data types, and the like, that are not supported by the backend web services 430, and vice versa.

Further, certain REST web services 423 and/or REST resources 527-528 may be dynamically created within the reverse proxy server 420 in some embodiments. For example, the REST infrastructure 422 (and/or 522, 722, and 922) and/or other components within the reverse proxy server 420 may generate, delete, replace or update various REST services and/or REST resources during runtime. In such cases, even though certain REST resources 528 might not exist on the reverse proxy server 420 at certain times, those resources may nonetheless still be exposed by the reverse proxy server 420 at the same times. For example, a Web Application Description Language (WADL) file may be generated to describe all of the resources exposed by a REST web service 423/523. The WADL file may be used to determine which REST resources 528 are exposed by the REST service 423, even if some of those resources 528 have not yet been created. The techniques for dynamically generating and updating various REST services 423/523 and REST resources 528 within the reverse proxy server 420 are described in more detail below in reference to FIGS. 7 and 8

In order to determine in step 602 whether or not the request is directed to a REST resource 528 exposed by a REST service 423/523 in the reverse proxy server 420, the request may be parsed and analyzed to identify the request destination and relevant portions of the message header and/or body. For example, if the request is an HTTP request directed to a URL that corresponds to a REST resource within a WADL file (or other web service description data) for a REST service 423, then the request handler 421 may determine that the request is directed to a REST resource 528 exposed by the reverse proxy server 420 (602:Yes). Alternatively, if the request is an invalid request, a SOAP request, a request for normal web content, or a request directed to a REST resource that is not accessible via reverse proxy server 420, then the request handler 421 may determine that the request is not directed to a REST resource 528 exposed by the reverse proxy server 420 (602:No).

In step 603, the REST web service request received in step 601 may be forwarded to the REST infrastructure 422 within the reverse proxy server 420. For example, after determining that the web service request is a request for a REST resource exposed by the reverse proxy server 420 in step 602, the request handler 421 may forward the request to the REST stack 524 within the REST infrastructure 422, and the REST stack 524 may then forward the request to the static REST application 525. As discussed above, in some embodiments, the REST stack 524 may be a JAX-RS stack, and the static REST application may be a JERSEY application generated during build-time. In some cases, components within the reverse proxy server 520 may be configured to dynamically initialize the JAX-RS stack 524 and register the static JERSEY application 525.

In step 604, various components within the reverse proxy server 420 (and/or reverse proxy servers 520, 720, and 920) may determine whether or not the requested REST resource(s) currently exist on the reverse proxy server 420. As noted above, in some embodiments, the REST web services 423 may be dynamically created, that is, generated during runtime by the REST infrastructure 422 (and/or 522, 722, and 922) and/or other components within the reverse proxy server 420. Therefore, in step 604, the REST infrastructure 422 and/or REST services 423 may determine whether or not requested REST resources currently exist on the reverse proxy server 420. In some cases, upon receiving a REST request (602:Yes), the REST stack 524 (e.g., a JAX-RX stack) may receive the request and invoke the static REST application 525 (e.g., a JERSEY application), which may invoke the registered REST provider resource 526. The REST provider resource 526 may delegate the request to the appropriate REST service 423 and/or the appropriate REST resources 428 within the virtual REST services 423. If the REST provider resource 526 and/or the root resource 527 of the invoked REST service determines that the requested resource has previously been generated (604:Yes), then the request may be forwarded to the root resource 527 of the REST service 523 in step 606, and then to the appropriate REST resource 528 to handle the request in step 607. In some embodiments, the provider resource 526 may determine the appropriate REST root resource 527 using the URI of the request, and the REST root resource 527 may be mapped to the "/" path of the resource. The REST root resource 527 then may user a sub-resource locator to locate the actual REST resource 528 within the reverse proxy server 420 to handle the request.

Alternatively, if one or more components within the REST infrastructure 526 and/or the invoked REST service 523 determine that the requested REST resource has not yet been generated (or needs to be regenerated) (604:No), then the requested appropriate REST resource to handle the request may be generated in step 605. The generation of virtual REST web services 423 within the reverse proxy server 420 is discussed below in more detail in reference to FIGS. 7-8. After the appropriate REST resource to handle the request has been generated in step 605, the request then may be forwarded to the root resource 527 of the REST service 523 in step 606, and then to the newly created REST resource 528 in step 607.

In step 608, one or more backend web service calls may be determined during handling of the request, for example, during the execution of the REST resource 528 within the reverse proxy server 420. In some embodiments, a software hook and/or other customized software code may be inserted into the REST resource 528 when the resource is created. Such software hooks and/or customized software code may identify backend REST services 430 and resources, as well as individual operations (or methods), parameters, and other data that may be transmitted in a call to a backend web service 430. When the REST resource 528 on the reverse proxy server 420 is invoked to handle the request, the software hook and/or customized software code may be executed and the call to the backend web service 430 may be generated.

In some cases, the backend web service call determined in step 608 may be similar or identical to the REST request handled by the REST resource 528 on the reverse proxy server 420. For instance, as described below in more detail, REST services 423 within the reverse proxy server 420 may be created as copies of backend REST services 430, having the same resource definitions (e.g., based on a Web Application Description Language (WADL) file), supporting methods and parameters, etc. In such cases, a REST resource 528 on the reverse proxy server 420 may contain a simple software hook configured to invoke the same REST resources, call the same methods with the parameters and/or body content, etc., within a corresponding backend REST web service 430.

In various other cases, the backend web service call determined in step 608 may be different from the REST request initially handled by the REST resource 528 on the reverse proxy server 420. In such cases, the REST services 423/523 and resources 528 exposed to client devices 410 by the reverse proxy server 420, need not correspond at all to the REST resources exposed by the backend REST services 430. For instance, referring briefly to FIGS. 4A and 4B, while virtual REST service 423a and its corresponding backend REST service 430a may be implemented similarly in some cases (e.g., having a similar (or the same) WADL file, including the same resources, supporting the same methods, parameters, data types, etc.), in other cases, the virtual REST services 423 and corresponding backend services 430 may be implemented quite differently. To illustrate, the REST request received from the client device 410 in step 601 may include a URL path to a REST resource 528, an HTTP method, one or more URL parameters and/or additional parameters or data within the message headers or body. However, when the REST resource 528 executes to handle the message, it may generate a backend web service calls having a different URL path (e.g., a different sub-resource path or resource name), a different HTTP method, different URL parameters, and/or different header or body data. Additionally, in some embodiments, the backend web services 430 need not be REST services, but may be SOAP services, URLs, or other types of web services, web applications, or web content. In such cases, the REST resources 528 within the reverse proxy server 420 may be configured to generate SOAP and URL calls and/or to invoke various different types of backend web services, applications, web content, etc. Thus, client devices 410 might only have knowledge of REST resources 528 exposed by the REST services 423/523 within the reverse proxy server 420, and might not have any awareness of the design or structure of the underlying backend web services 430. The use of different web service/resource designs and implementations for the virtual REST services 423 and their corresponding backend services 430 may be advantageous in some embodiments, for example, to obscure the underlying design of the backend services 430 from untrusted client devices 410, and to provide for easier integration, compatibility, and scalability among backend web services 430.

In step 609, after the backend web service call has been generated, the reverse proxy server 420 may enforce various security policies (and/or other communication management policies) associated with the backend web service call. Then, in step 610, the call may be executed within the reverse proxy server 420, to invoke one or more backend web services 430 within the trusted internal network 460. As described below in more detail in reference to FIGS. 9-10, the REST resources 428 within the reverse proxy server 420 may provide the backend web service calls to a policy enforcement engine 960 which may process the calls and enforce various policies. In certain embodiments, security policies (and/or other communication management policies) may be enforced at various different attachment points (e.g., OnRequest, OnInvoke, OnResponse, MessageTransformation, OnError, etc.) within an end-to-end processing flow of the request-response from the client 410 to the backend web services 430 and back.

Figure 7:
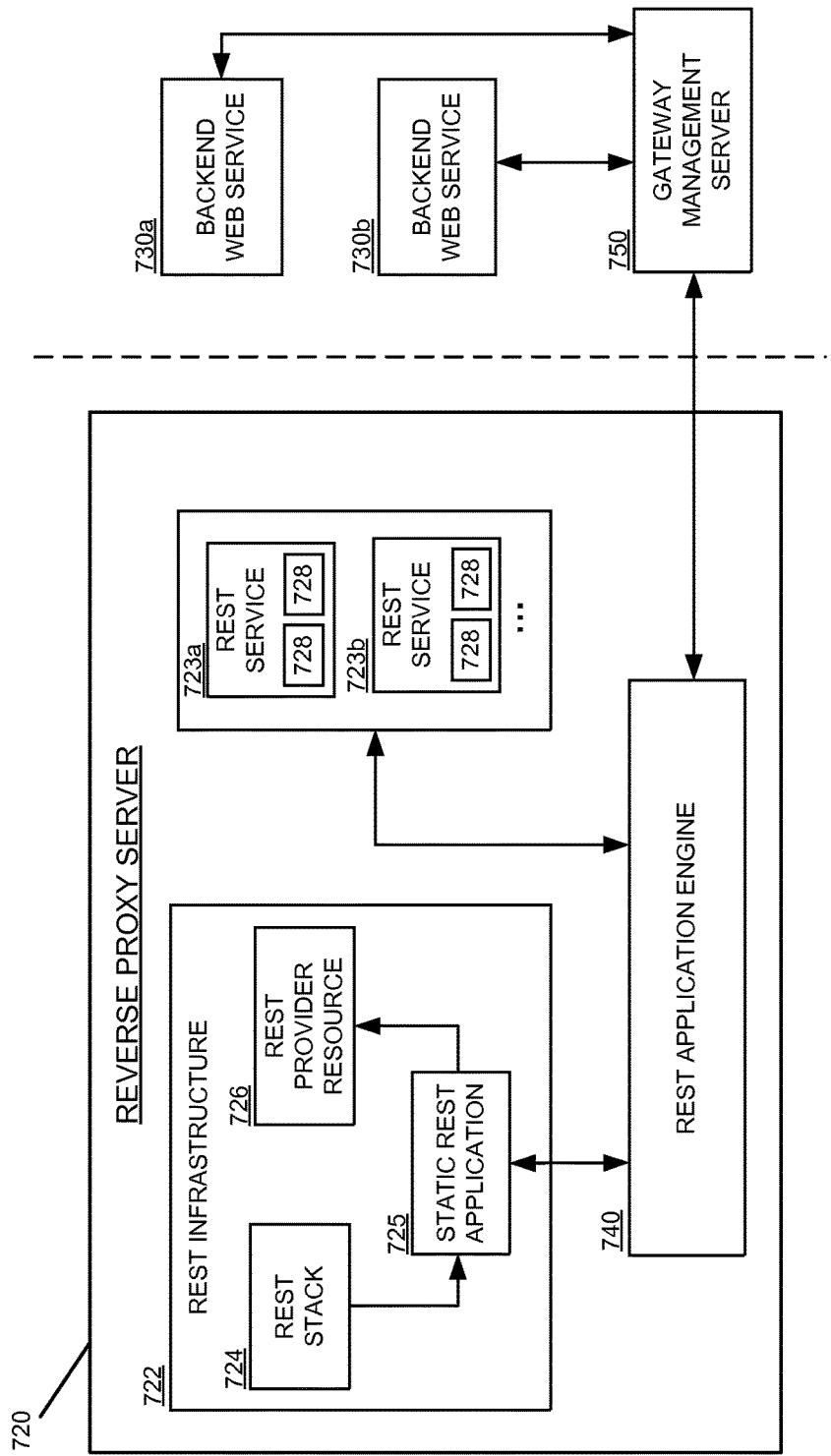
FIG. 7 is another block diagram illustrating, at a high-level, a reverse proxy server for dynamically generating REST services and REST resources, according to one or more embodiments of the present invention.

FIG. 7 is a block diagram illustrating certain elements and systems of a reverse proxy server according to one or more embodiments. The reverse proxy server 720 in this example may correspond to reverse proxy server 420 and/or reverse proxy server 520, and the various subcomponents 722-723 of the reverse proxy server 720 may be similar or identical to the corresponding subcomponents discussed above. Additionally, reverse proxy server 520 may operate within computing environment 400 or other similar environments, and may be configured to process and transmit messages between client computing devices and backend web services. Accordingly, reverse proxy server 720 may include some or all of the hardware, software, and networking components and functionality discussed above in reference to FIG. 4A-4B and/or FIG. 5.

Certain components illustrated in FIG. 7 may be configured to generate REST web services 723 within the reverse proxy server 720. As noted above, in some embodiments, REST services 723, along with the REST resources 728 contained in or exposed by the REST services 723, may be dynamically created within the reverse proxy server 720. In such embodiments, the REST infrastructure 722, REST application engine 740, gateway management system 750 and/or other components within the reverse proxy server 720 may be configured to generate, delete, replace or update various REST services 723 and/or REST resources 728 within the reverse proxy server during runtime.

In this example, the REST infrastructure 722 includes a REST stack 724, a static REST application 725 (e.g., a JERSEY application generated during build-time), and a REST provider resource 726. The reverse proxy server 720 may dynamically initialize the REST stack 724 during runtime, and may register the static REST application 725 which may return a REST provider resource 726. The REST application 725 and/or provider resource 726 may be configured to determine which REST services 723 and resources 728 exposed by the reverse proxy server 720 have been generated on the reverse proxy server 720. In this example, the REST application 725 may determine when a REST web service 723 or REST resource 728 should be created, for example, to handle a REST request from a client device 410. The REST application 725 then may instruct the REST application engine 740 to generate the new REST services 723 and/or resources 728.

FIG. 7 includes a REST application engine 740 within the reverse proxy server 720, and a gateway management server 750 (e.g., within the internal network 460) configured to communicate with the reverse proxy server 720. The REST application engine 740 may include one or more software tools or platforms configured to generate REST services 723 and/or resources 728 within the reverse proxy server 720. As discussed below, the REST application engine 740 may receive REST service and/or resource description data, for example, via a WADL file received from the gateway management server 750. The REST application engine 740 then may generate, build, and deploy REST services 723 and resources 728 within the reverse proxy server 720.

Figure 8:
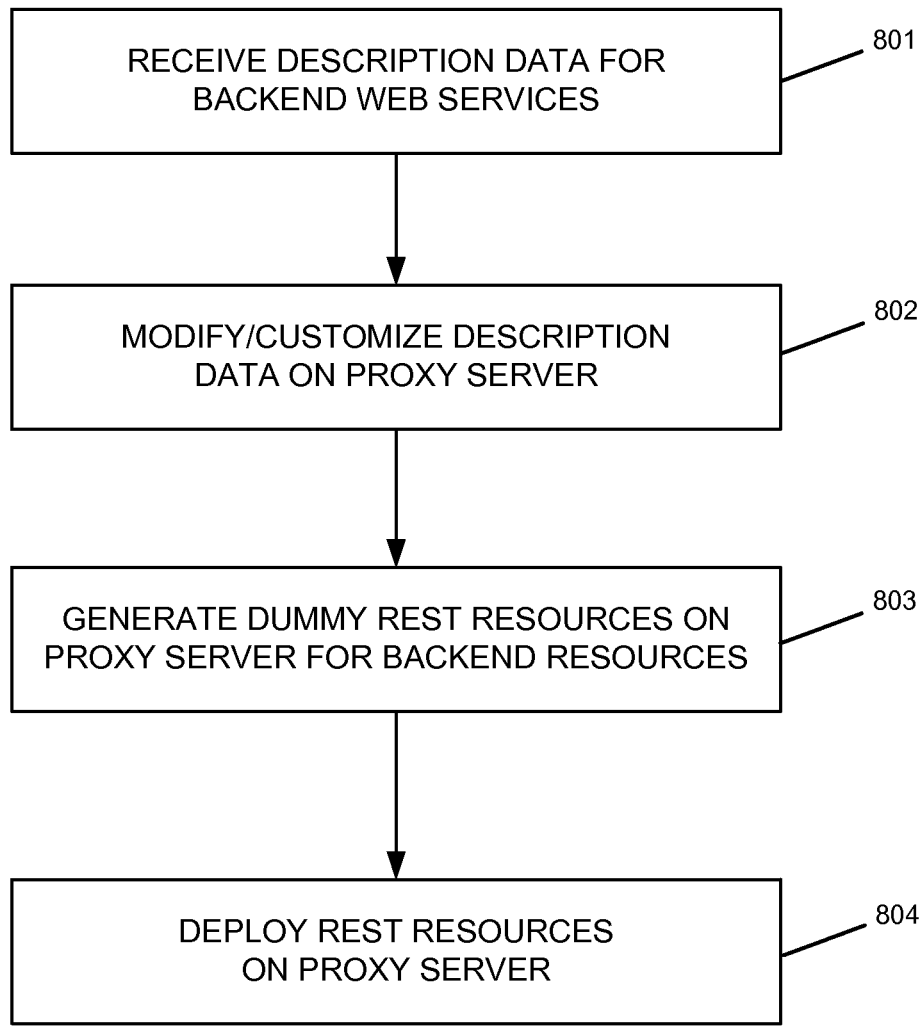
FIG. 8 is a flowchart illustrating a process for generating, building, and deploying REST services and REST resources on a reverse proxy server, according to one or more embodiments of the present invention.

Referring now to FIG. 8, a flowchart is shown illustrating a process for dynamically generating REST services and/or resources within a reverse proxy server. As described below, the steps in this process may be performed by one or more components discussed above, such as reverse proxy server 420 (and/or reverse proxy servers 520, 720, and 920), the REST application engine 740, the gateway management server 750, and/or the various subsystems and subcomponents implemented therein. Additionally, in some embodiments, certain steps in this process may be performed within client devices 410, backend web services 430, and/or by other various intermediary devices. It should further be understood that the techniques described herein, including transmitting and receiving web service description data, and dynamically generating REST services and resources, need not be limited to the specific system and hardware implementations described above, but may be performed within other hardware and system environments comprising other combinations of the hardware, software, and network components.

As noted above, steps 801-804 may be performed in relation to processes for dynamically generating REST services and resources within a proxy server. For example, REST services 723 and REST resources 728 may be created during runtime, rather than during build time, within the reverse proxy server 720. The dynamically generation of a REST service or resource may be initiated (or triggered) based on various information received by the reverse proxy server 720 during runtime. For instance, a REST request received from a client device 410 may initiate a dynamic REST service/resource generation process within the reverse proxy server 720, if the requested REST resource has not yet been created within the reverse proxy server 720. As another example, the deployment of a new backend web service 730, or a modification to an existing backend web service 730, may initiate a dynamic REST service/resource generation process within the reverse proxy server 720, in order to synchronize the REST services 723 in the reverse proxy server 720 with the backend web services 730.

In step 801, data describing (and/or defining) one or more backend web services 730 may be received within the reverse proxy server 720. In some embodiments, the description data received in step 801 may include one or more Web Application Description Language (WADL) files generated by the backend web services 730 and/or a trusted gateway management server 750. A WADL file for a REST service 730 may describe all of the resources exposed by the REST service, including the resource URLs, supported methods, parameters, data types, and the like. As noted above, backend web services 730 may include REST web resources 730 as well as other types of web services 730, such as SOAP web services and other types of backend web services, applications, web content, etc. Thus, for SOAP web services 730 Web Service Description Language (WSDL) may be used instead of WADL, and various other data formats may be used in other examples depending on the types of the backend web services 730.

Regardless of the type or format of the received description data, the data may be transmitted in a machine-readable format that may be parsed by the recipient device to determine the structure and supported operations of the backend web resources 730. In some embodiments, the description data (e.g., WADL files) may be generated by individual backend web services 730, provided to the gateway management server 750, and then transmitted to the REST application engine 740. For instance, the gateway management server 750 may automatically transmit updated description data to the REST application engine 740, in response to the deployment of a new backend web service 730 or a modification to an existing backend web service 730. In other instances, the REST application engine 740 may retrieve the description data from the gateway management server 750 (or directly from the backend web services 730), either periodically or in response to an event occurring within the reverse proxy server 720.

In steps 802-804, the REST application engine 740 and/or other components within the reverse proxy server 720 may generate, build, and deploy REST services 723 and/or REST resources 728 within the reverse proxy server 720. In this example, in step 802, the REST application engine 740 may modify and/or customize REST service description data based on the resources exposed by the backend web services 730. In step 803, the REST application engine 740 may create one or more dummy rest resources within the reverse proxy server 720 using the REST service description data modified/customized in step 802. Finally, in step 804, the REST application engine 740 and/or REST infrastructure 722 may deploy the REST services 723 and/or resources 728 generated in step 803, within the reverse proxy server 720.

In some embodiments, the steps of generating and building the REST services may be performed within the reverse proxy server 720, for example, by the REST application engine 740 and/or REST infrastructure 722. However, in other examples, the REST services 723 and REST resources 728 may be designed, generated, and/or built remotely from the reverse proxy server 720 (e.g., within the internal network 460), before being provided to and deployed on the reverse proxy server 720.

The modifications and/or customizations to the REST resources 728 may take the form of a software hook and/or other customized software code inserted into a dummy REST resource to invoke one or more backend web services 730. Such software modifications/customizations may, for example, identify a backend REST service 730 and resources, as well as individual operations (or methods), parameters, and other data that may be transmitted in a call to a backend web service 730. After the REST resource 728 is built and deployed on the reverse proxy server 720, the software hook and/or customized software code may be executed to invoke the backend web service 730. As discussed above, in some cases the software code inserted into REST resources 728 in step 803 may include simple software hook configured to invoke the same REST resources, call the same methods with the parameters and/or body content, etc., within a corresponding backend REST web service 730. In other cases, the modified/customized code in step 803 may be designed to invoke one or more different backend web services 730, using different URL paths (e.g., a different sub-resource path or resource name), different HTTP methods, different URL parameters, and/or different header or body data. Additionally, as discussed above, the backend web services 730 need not be REST services, but may be SOAP services, URLs, or other types of web services, web applications, or web content. In such cases, the software customization/modification in step 803 may include custom code generate SOAP and URL calls and/or to invoke various different types of backend web services, applications, web content, etc.

When deploying REST resources 728 within the reverse proxy server 720 in step 804, each resource 728 may be deployed within a REST service 723 hierarchically according to the URL of the resource 728. As discussed above, REST services may have a root resource that is the highest-level resource within the service 723 (e.g., mapped the "/" path of the service) and is responsible for identifying the sub-resources 728 (or child resources) that will handle the different requests.

Figure 9:
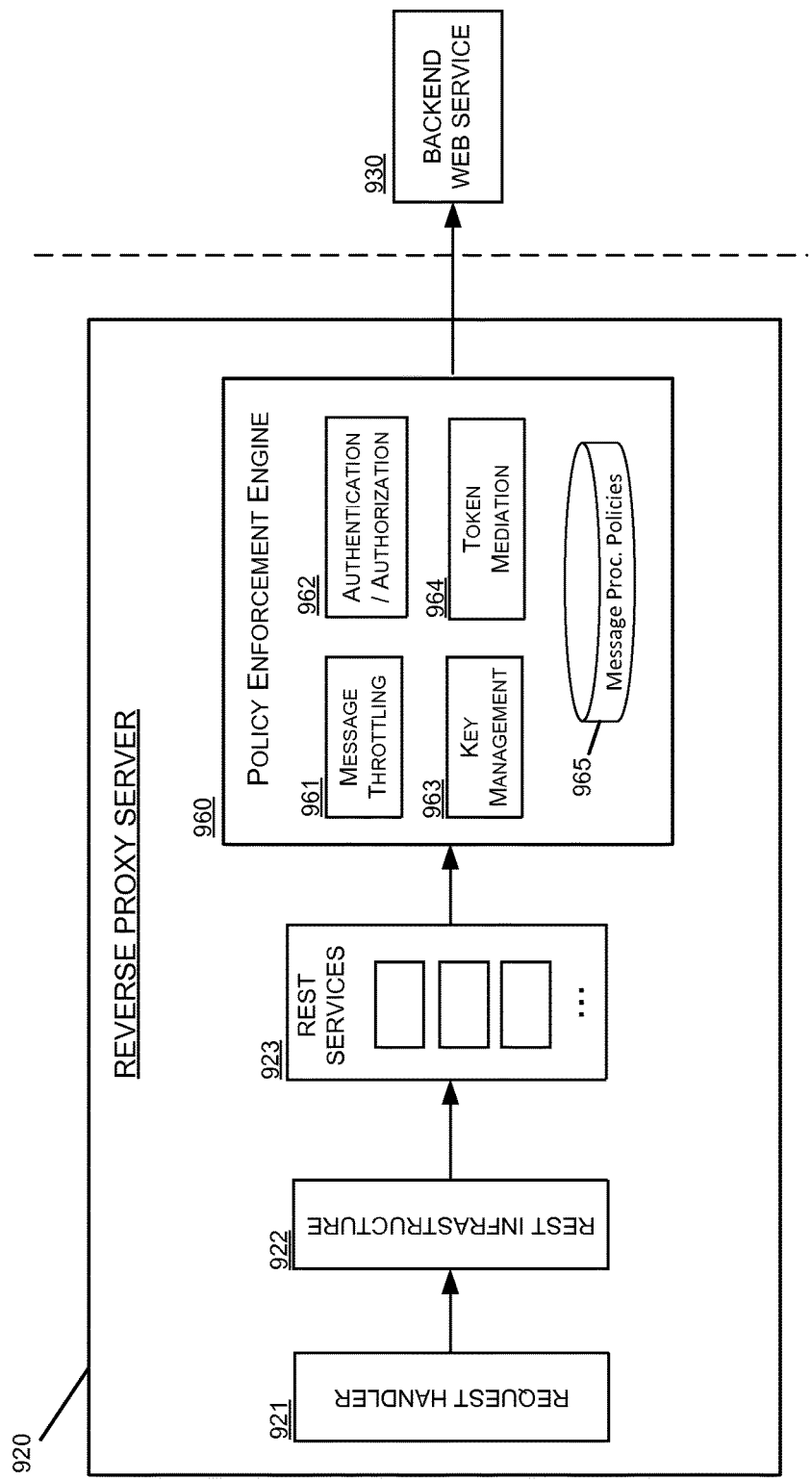
FIG. 9 is another block diagram illustrating, at a high-level, a reverse proxy server including a policy enforcement engine, according to one or more embodiments of the present invention.

FIG. 9 is a block diagram illustrating elements and systems of a reverse proxy server 920, including a policy enforcement engine 960. The reverse proxy server 920 in this example may correspond to reverse proxy server 420 (and/or 520 and 720), and the various subcomponents 921-923 of the reverse proxy server 920 may be similar or identical to the corresponding subcomponents discussed above. Additionally, reverse proxy server 920 may operate within computing environment 400 or other similar environments, and may be configured to process and transmit messages between client computing devices and backend web services. Accordingly, reverse proxy server 920 may include some or all of the hardware, software, and networking components and functionality discussed above in reference to FIG. 4A-4B, FIG. 5, and/or FIG. 7.

In addition to the request handler 921, REST implementation 922, and REST services 923, this example illustrates a policy enforcement engine 960 within the reverse proxy server 920. In this example, the REST services 923 and their respective REST resources 428 may provide any backend web service calls to be invoked to policy enforcement engine 960. The policy enforcement engine 960 may process the backend web services calls and enforce various security policies and other communication management policies before and/or after invoking the backend web services 930.

The policy enforcement engine 960 may include various security systems or components configured to implement security policies, as well as other communication management policies, within the reverse proxy server 920. In this example, policy enforcement engine 960 includes a message throttling system 961, authentication and authorization systems 962, a key management system 963, and a token mediation system 964. These systems and security components within the policy enforcement engine 960 may authenticate messages from client devices 410, provide security token mediation, perform API key management, perform fine grained authorization and/or data redaction, support confidentiality and integrity, perform risk-based authentication, perform device-based security for mobile client devices 410, support demilitarized zone (DMZ) threat protection, perform protocol and payload mediation, and the like. For example, authentication/authorization systems 962 may include subsystems to prevent of Denial of Service (DoS) attacks, detect and filter malformed messages, detect and prevent SQL, JavaScript, and/or XPath/XQuery injection attacks, perform message validation to protect against malicious content (e.g., detect viruses within message attachments, validate XML and JSON data structures, validate form and query parameters, etc.). Token mediation system 964 may be configured to convert authentication tokens between specified client devices 410 and backend web services 930. Security systems 961-964 may also support orchestration and by removing of operations, for example, by aggregating multiple backend APIs or services and perform automatic mediation or composition.

Additionally, in this example, the policy enforcement engine 960 includes a data store of message processing policies 965. Message processing policies may be stored in various forms of computer-readable media, such as XML, JavaScript, or other types of executable software components. As discussed below in more detail, message processing policies 965 may be used to enforce security policies and other communications management policies within the reverse proxy server 920. Data store 965 may include individual message processing policies that may be retrieved and applied to individual messages at various stages during an end-to-end processing flow for the individual messages. The message processing policy data store 965 may reside in the reverse proxy server 920, as shown in this example, or may reside within a backend server of a trusted internal computer network 460, or a secure third-party server, or the like.

Figure 10:
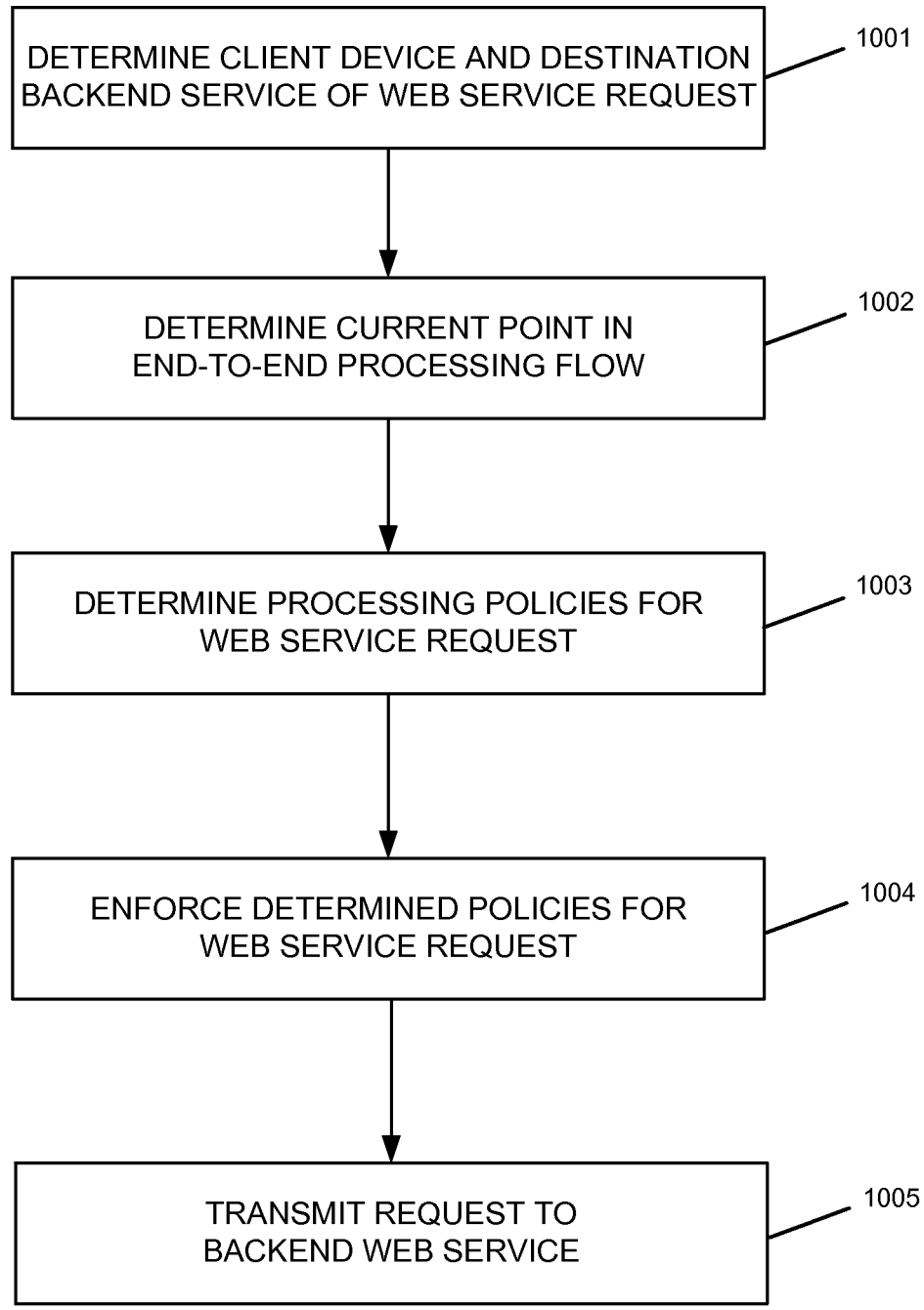
FIG. 10 is a flowchart illustrating a process for processing and transmitting messages using determined message processing policies, according to one or more embodiments of the present invention.

Referring now to FIG. 10, a flowchart is shown illustrating a process for determining message processing policies and processing messages such as REST requests and other backend web service calls. As described below, the determination and enforcement of message processing policies may be performed by one or more components in the reverse proxy server 920 (and/or 420, 520, and 72), along with the various subsystems/subcomponents implemented therein. Additionally, in some embodiments, certain steps in this process may be performed within client devices 410, backend web services 930, and/or by other various intermediary devices. It should further be understood that the techniques described herein, including monitoring end-to-end message processing flows, determining message processing policies, and enforcing the message processing policies, need not be limited to the specific system and hardware implementations described above, but may be performed within other hardware and system environments comprising other combinations of the hardware, software, and network components.

In step 1001, the policy enforcement engine 960 may analyze the message received from the REST service 923 to determine the destination backend service 930 for the message, as well as the client device 410 that initiated the message. The destination of the message may be determined by parsing and analyzing the backend web service call (e.g., REST request, SOAP request, or web content request) generated by the REST service 923. For example, the uniform resource identifier (URI) of a REST or SOAP request, or an identifier of a web service or application and/or operation identifiers within the message body may correspond to a backend web service/application 930 or web content provided by the internal network 460. In this example, the proxy server 920 may determine based on the message header and content that the message is intended for a specific computer server hosting a web service 930 within the internal network 460. Information within the message identifying the transmitter of the message, such as a source IP address or host name identifier, also may be used to determine the intended destination of the message. In addition to determining the intended destination of the message, the proxy server 420 may determine the client device 410 from which the message was initiated.

In step 1002, the policy enforcement engine 960 may determine a current point in a predetermined processing flow for the message to be transmitted to the backend web service 930. A message processing flow may refer to an end-to-end message processing flow to be executed by the proxy server 920, beginning with the receipt of the message by the proxy server 920 from the client device 410, and concluding with the transmission of the response by the proxy server 920 back to the client device 410. As discussed below, determining a current point in a predetermined processing flow for a message may include identifying a policy model associated with the message, and determining a current processing location within the processing model.

In some embodiments, predetermined message processing flows for messages may be defined by policy models. A policy model may include data defining a set of policies (e.g., security policies, communication management policies, etc.) that may be applied by the policy enforcement engine 960 to process the message at various points during the end-to-end message processing flow of the message. Both the policy models that define the end-to-end processing flow of a message, and the individual message processing policies, may be various forms of computer-readable media, such as XML, JavaScript, or other types of executable software components. Policy models and/or message processing policies may be stored within the policy enforcement engine 960, for example, in data store 965, or elsewhere within the internal network 460.

As noted above, policy models may define a set of message processing policies that the policy enforcement engine 960 may apply to a message at various points in the message's end-to-end processing flow. In some embodiments, the policy enforcement engine 960 may apply different policy models in step 1002, depending on the characteristics of the message received from the REST services 923. For example, the specific policy model retrieved and applied by the policy enforcement engine 960 may depend on the intended destination of the message and/or the client device 410 that initiated the request. Additionally, the policy model retrieved and applied by the policy enforcement engine 960 may depend on the network protocols used to transmit the message and/or the request type or client type of the message. For instance, different policy models may be used for REST requests, SOAP requests, web content (URL) requests, and the like.

In some examples, policy models may be implemented in XML or other machine-readable format. Policy models may include tags or identifiers of various points within processing flows (which also may be called "assertions"), and one or more policy identifiers for each of processing points/assertions. For instance, a policy model may identify policies to be performed when a request is received (within "on-request" tag), policies that perform message transformation (within "message-transformation" tags), and policies to be performed when the backend web service is invoked (within "on-invoke" tags).

In some embodiments, the policy enforcement engine 960 may apply policies at the service level (or URL level) and/or at the operation level (or method level). Therefore, when invoking backend web services 930, the policy enforcement engine 960 may first determine the operation (for SOAP) or the method (for REST and URL) before it can enforce the policies identified within the policy model.

After identifying a policy model (or other data defining a processing flow) associated with the message received from the REST service 923, the policy enforcement engine 960 may determine the current point in the processing the message in accordance with the policy or processing flow. The current point in the message processing flow may be determined by the characteristics of the message itself, as well as based on the previously stored data regarding the earlier processing of the message. As noted above, a predetermined processing flow may apply end-to-end processing for a message, from the initial request by a client device 410, to the response transmitted back to the client device 410. Therefore, determining whether the message is an initial request from a client device 410, a transmission of additional data from a client device (e.g., authentication credentials or additional data related to a request), a response from a backend web service 930, or a transmission of additional data from a backend server or device (e.g., data from a single sign-on or token translation service), may allow the policy enforcement engine 960 to determine the current point of message processing within the end-to-end message processing flow. Additionally, the policy enforcement engine 960 may store data relating to previous processing performed on the message or other related messages, such as the results of previous message transformations, invocations of services, processing errors encountered, in order to determine the next message processing policy that the policy enforcement engine 960 should apply to the message.

The following paragraphs include several examples of possible points (which also may be called "assertions") within a policy model or other message processing flow, at which message processing policies may be applied. It should be understood that these examples are illustrative only and need not be an exhaustive list. Moreover, the assertion names described herein (e.g., OnRequest, OnInvoke, OnResponse, OnError, MessageTransformation, etc.), as well as the XML structures and tag names used for assertions and policies may be changed in various other embodiments.

A first example of determining a current point within a policy model or other predetermined message processing flow in step 1002, may include determining that the received message corresponds to a request from a client device 410 in an external computer network. This point, at the beginning of the end-to-end processing flow of the message, may be referred to as an "OnRequest" assertion or the like. As discussed below in more detail, an OnRequest assertion may include references to policies that may be applied in order to secure virtual services, proxy services, and/or web applications. For example, an OnRequest assertion may include URIs or other identifiers representing the security policies that the policy enforcement engine 960 should enforce for new web service/application/content requests received from external client devices 410. OnRequest assertions also may refer to other policies and/or may contain other assertions. In some cases, OnRequest assertions may only operate in reverse proxy mode, that is, may only handle requests from external client devices 410 for internal web services 930.

Another determination of the current message processing point that may occur in step 1002 may include, after receiving the request from the client device 410, determining that the proxy server 920 should transmit the request to a backend web application or web service 930. This point within the end-to-end processing flow of the message may be referred to as an "OnInvoke" assertion or the like. Like the OnRequest assertion, in some embodiments, the OnInvoke assertion may apply only in reverse proxy use cases in which the initial request was received from an client device 410 to invoke backend web services/applications 930 within the internal network 460. OnInvoke assertions may include URIs or other identifiers representing the policies that the policy enforcement engine 960 should enforce during this point in the end-to-end processing flow. Multiple policy identifiers (or references) may be including within an OnInvoke assertion, for example, by using multiple XML "Policy URI" XML elements. Additionally, OnInvoke assertions may uniquely identify the client details from using the client's resource pattern. The client type used for OnInvoke assertions (e.g., a REST client, SOAP client, URL/web client, etc.) may be determined by policy enforcement engine 960 at runtime, based on the values configured within the OnInvoke assertion. OnInvoke assertions also may refer to other policies and/or may contain other assertions.

Another example of determining the current message processing point may include, after receiving the request from the client device 410 and after invoking the backend web service 430, determining that the proxy server 920 should transmit the response to the client device 410. This point within the end-to-end processing flow of the message may be referred to as an "OnResponse" assertion or the like. Like the OnRequest and OnInvoke assertions, in some embodiments, the OnResponse assertion may apply only in reverse proxy use cases in which the initial request was received from an client device 410 to invoke a backend web service 930 within the internal network 460. OnResponse assertions may include URIs or other identifiers representing the policies that the policy enforcement engine 960 should enforce during this point in the end-to-end processing flow. Multiple policy identifiers (or references) may be including within an OnResponse, and OnResponse assertions also may refer to other policies and/or may contain other assertions.

Another example of determining the current message processing point may include, at some point during the end-to-end processing flow, determining that the proxy server 920 should transform the message from one message type to another. This point within the end-to-end processing flow of the message may be referred to as a "MessageTransformation" assertion or the like. For instance, the proxy server 920 may receive a message having of a first message type (e.g., a REST request), and may analyze the message to determine that the message is intended for a backend service or application that only accepts a second message type (e.g., a back SOAP service). After such a determination, the policy enforcement engine 960 may execute the appropriate MessageTransformation assertion on the message, before sending the transformed message to the intended destination. Examples of transformation policies that may be supported by the policy enforcement engine 960 may include, without limitation, XML to JavaScript Object Notation (JSON) and JSON to XML policies, XML to SOAP and SOAP to XML policies, and JSON to SOAP and SOAP to JSON policies. Transformation between other well-known media types may be supported in various embodiments. The policy enforcement engine 960 may automatically attach the appropriate transformation policies at the time of the backend service virtualization, and the transformations may be performed using one or more translation frameworks installed at the proxy server 920 or elsewhere in the computing environment.

Another yet example of determining the current message processing point may include determining that an error has occurred at some point during the end-to-end processing flow for the message. This point within the end-to-end processing flow of the message may be referred to as an "OnError" assertion or the like. The errors triggering an OnError assertion for a message (e.g., triggering the execution of one or more policies identified in an OnError assertion associated with a message), may be errors occurring within the processing done by the reverse proxy server 920 and/or error received by the reverse proxy server 920 from a backend computer server or device. For example, the reverse proxy server 920 may receive an error indication from a backend computer server invoked during the processing flow of the message, such as an authorization service, a token translation service, or a backend web service 930. Additionally, the reverse proxy server 920 may identify or generate errors while performing message processing tasks, such as errors in parsing or validating a message, or errors when executing a message transformation policy. Thus, unlike some of the previous examples of the points within processing flows (also called "assertions") at which specific message processing policies may be applied, OnError assertions may be conditional. That is, during the end-to-end processing flow of a message, the policy enforcement engine 960 may apply a policy from OnError assertion once, multiple times, or not at all depending on the number and type of errors that may occur during the processing.

In step 1003, one or more specific policies for processing the message received in step 501 may be determined by the policy enforcement engine 960. As discussed above, the specific policies selected and applied to messages by the reverse proxy server 920 may include security policies as well as any other types of communication management policies. For example, and without limitation, such policies may perform functions relating to authentication, authorization, auditing, single sign on, security policy enforcement, key management and distribution, secure communication, secure data storage, and secure data sharing, among others.

Policies may be selected in step 1003 by policy enforcement engine 960 by first retrieving the end-to-end processing flow(s) (e.g., policy models) that are associated with the message, and then using the current point (e.g., assertion) within the end-to-end processing flows, determined in step 1002, to identify the specific policies that will be applied to the message at the current point in the end-to-end flow. For instance, if the message is a request from an client device 410 for a backend web service 430, then the policy enforcement engine 960 may retrieve any policies identified within the "on-request" tag of the policy model governing the end-to-end processing flow for the message.

In step 1004, the policy enforcement engine 960 may process the message using the policies selected in step 1003. As discussed above, the policy enforcement engine 960 may determine the appropriate policies to be applied to the message by identifying URIs or other policy identifiers from a predetermined end-to-end processing flow for the message. In some embodiments, policy models may contain policy URIs (or other identifiers) for policies to be applied depending on the assertions that correspond to the current point in the end-to-end processing flow. Such policy URIs may reference the storage locations of the policies. In other examples, policies identifiers need not be represented as URIs, but may be include other identifying data such as API or service identifiers, function names, method names, and/or operation names, and the like. In any case, policy identifiers may identify the storage location or other access information for the message processing policies. The policies themselves may be stored in various forms of computer-readable media, such as XML, JavaScript, or other types of executable software components.

Message processing policies may be stored in data stores, such as databases and/or file-based storage systems, located in various different servers or devices within the computing environment. For example, certain policies may be stored locally within the proxy server 920 (e.g., within the message processing policy data store 965), such as message transformation policies, message throttling policies, load balancing policies, and other policies which may be relatively unchanging and are without secure data. Other policies may be stored within a secure server or storage system of trusted internal computer network 460, such as user authentication/authorization policies and other policies that may be change frequently or may include secure data. In other cases, certain policies may be stored on secure third-party servers or client devices 410 in external networks. The policy enforcement engine 960 may be configured to retrieve and apply policies from any of these various locations in step 1004.

In step 1005, after processing the message using various security policies and/or other communication management policies in step 1004, the reverse proxy server 920 may transmit the processed message to its intended destination. As discussed above, the intended destination may be determined in step 1001 by parsing and analyzing portions of the message header and/or message body. The intended destination of the message may be within the internal network 460, such as a request to a backend web service 930. Alternatively, the intended destination of the message may be in an external network, such as a request to an external web service or application, or a response or other transmission to an client device 410.

As discussed above, the selection and application of specific policies for processing a message within the proxy server 920 may be determined by a predetermined end-to-end processing flow for the message, along with a determination of the current processing point for the message within the end-to-end flow. Policy models, introduced above, may define the set of message processing policies that the policy enforcement engine 960 may apply to a message at various points in the message's end-to-end processing flow. In some embodiments, policy models and other techniques for defining end-to-end processing flows may be created using a set of policy templates. Such templates may correspond to specific assertions, and may be used to create policy models end-to-end processing flows. For example, one or more assertion templates may be copied and the appropriate policy URIs may be inserted into each template copy. The customized templates then may be added to appropriate policy models to define the policies that may be executed during the end-to-end processing flow.

In addition to defining the assertions and policies to be executed during an end-to-end processing flow, policy models enforced by the policy enforcement engine 960 (and other forms of predetermined end-to-end processing flows) also may define the conditions under which certain policies may or may not be performed. In some embodiments, a policy model may contain a set of logical instructions to that implement conditions for performing each of the policies referenced in the policy model. For example, a policy model may include conditions that instruct the proxy server 920 that a certain policy should be executed for some message types (e.g., SOAP, REST, or URL messages), but not for other message types. Additionally, as discussed above, policy models may selectively apply policies at the service/application level and/or at the operation/method level in some cases, and thus the application of specific policies may depend not only on the backend web service 930 being invoked, but also on the specific operations or methods being called within the service 930. In various additional embodiments, some policy models may include conditions that instruct the policy enforcement engine 960 that a certain policy should be executed for some users but not others, some client device types but not others, some backend web services/applications but not others, and/or any other characteristics relating to the message.

As the above examples illustrate, various embodiments described herein may support dynamic policy models in which different security policies and other communication management policies may be applied, within a DMZ or other logical or physical subnetwork, at various different processing points throughout the end-to-end processing flow of the message. This dynamic policy model framework may be used to build and implement additional security to prevent attacks from malicious external computing systems, and may implement additional types of security policies that might be not possible or preferable within the last mile security infrastructure (e.g., within the backend web services/applications 430). Additionally, robust authentication and authorization systems may be implemented using the dynamic policy model described herein, such as token translation and/or single-sign-on access control systems. For instance, a client device 410 may authenticate via a username/password or other user credentials, and a predetermined end-to-end processing flow may execute within the proxy server 420 that performs token retrieval and validation from trusted authentication/authorization services within the internal network 460, in order to retrieve or generate various different access tokens of different types (e.g., Kerberos tokens, SPNEGO tokens, username tokens, NTLM tokens, SAML tokens, etc.). Therefore, after the user provides one set of valid credentials and is successfully authentication and authorized, the various policy models within the proxy server 420 may be used to implement a single-sign-on access control system by retrieving or generating the corresponding token type for the various different backend web services/applications 430 subsequently accessed by the user.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of transmitting web service requests between computer networks, the method comprising:
    receiving, at a proxy server in communication with an internal computer network, a web service request from a client device in an external computer network separate from the internal computer network;
    identifying a first resource within the web service request;
    determining whether the first resource is exposed by a first Representational State Transfer (REST) web service within the proxy server;
    in response to determining that the first resource is exposed by the first REST web service, invoking the first REST web service within the proxy server;
    during execution of the first REST web service within the proxy server, invoking a second web service within a computer server in the internal computer network;
    accessing a Web Application Description Language (WADL) file describing a set of resources provided by the second web service within the computer server in the internal computer network; and
    generating one or more resources in the first REST web service within the proxy server, using the description in the WADL file of the set of resources provided by the second web service, wherein generating the resources in the first REST web service within the proxy server comprises:
        modifying one or more resource descriptions within the WADL file;
        creating one or more REST resources based on the modified resource descriptions; and
        deploying each of the REST resources in the first REST web service within the proxy server.

2. The method of claim 1, wherein invoking the first REST web service within the proxy server comprises:
    determining that the first resource exposed by the first REST web service does not exist within the proxy server; and
    generating the first resource within the proxy server, wherein the first resource is generated after the web service request is received from the client device.

3. The method of claim 1, wherein the second web service is a REST web service within the computer server in the internal computer network.

4. The method of claim 3, wherein the first REST web service within the proxy server exposes a plurality of resources, including at least one resource configured to invoke the second REST web service, and including at least one resource configured to invoke a third REST web service exposed by a different computer server in the internal computer network.

5. The method of claim 3, wherein the second REST web service exposes a plurality of resources, and wherein the first REST web service within the proxy server exposes a subset of the plurality of resources exposed by the second REST web service.

6. The method of claim 1, wherein the second web service is a Simple Object Access protocol (SOAP) web service within the computer server in the internal computer network.

7. The method of claim 1, further comprising:
    determining a current point in a predetermined processing flow for the web service request within the proxy server;
    retrieving one or more security policies, based on the determined current point in the predetermined processing flow for the web service request; and
    processing the web service request in accordance with the security policies, wherein the web service request is processed before invoking the second web service exposed by the computer server in the internal computer network.

8. A system comprising:
    a processing unit comprising one or more processors; and
    memory coupled with and readable by the processing unit and storing therein a set of instructions which, when executed by the processing unit, causes the processing unit to:
        receive a web service request from a client device in an external computer network, wherein the system is configured to operate within a subnetwork of an internal computer network separate from the external computer network;
        identify a first resource within the web service request;
        determine whether the first resource is exposed by a first Representational State Transfer (REST) web service within the system;
        invoke the first REST web service within the system, in response to determining that the first resource is exposed by the first REST web service;
        during execution of the first REST web service within the system, invoke a second web service within a computer server in the internal computer network;
        access a Web Application Description Language (WADL) file describing a set of resources provided by the second web service within the computer server in the internal computer network; and
        generate one or more resources in the first REST web service within the system, using the description in the WADL file of the set of resources provided by the second web service, wherein generating the resources in the first REST web service within the system comprises:
            modifying one or more resource descriptions within the WADL file;
            creating one or more REST resources based on the modified resource descriptions; and
            deploying each of the REST resources in the first REST web service within the system.

9. The system of claim 8, wherein invoking the first REST web service within the system comprises:
    determining that the first resource exposed by the first REST web service does not exist within the memory of the system; and
    generating the first resource within the memory of the system, wherein the first resource is generated after the web service request is received from the client device.

10. The system of claim 8, wherein the second web service is a REST web service within the computer server in the internal computer network.

11. The system of claim 10, wherein the first REST web service within the system exposes a plurality of resources, including at least one resource configured to invoke the second REST web service, and including at least one resource configured to invoke a third REST web service exposed by a different computer server in the internal computer network.

12. The system of claim 10, wherein the second REST web service exposes a plurality of resources, and wherein the first REST web service within the system exposes a subset of the plurality of resources exposed by the second REST web service.

13. A method of transmitting web service requests between computer networks, the method comprising:
receiving, at a proxy server in communication with an internal computer network, a web service request from a client device in an external computer network separate from the internal computer network;
identifying a first resource within the web service request;
determining whether the first resource is exposed by a first Representational State Transfer (REST) web service within the proxy server;
in response to determining that the first resource is exposed by the first REST web service, invoking the first REST web service within the proxy server; and
during execution of the first REST web service within the proxy server, invoking a second web service within a computer server in the internal computer network, wherein the second web service is a REST web service within the computer server in the internal computer network,
wherein the first REST web service within the proxy server exposes a plurality of resources, including at least one resource configured to invoke the second REST web service, and including at least one resource configured to invoke a third REST web service exposed by a different computer server in the internal computer network.

14. The method of claim 13, wherein invoking the first REST web service within the proxy server comprises:
determining that the first resource exposed by the first REST web service does not exist within the proxy server; and
generating the first resource within the proxy server, wherein the first resource is generated after the web service request is received from the client device.

15. The method of claim 13, further comprising:
accessing a Web Application Description Language (WADL) file describing a set of resources provided by the second web service within the computer server in the internal computer network; and
generating one or more resources in the first REST web service within the proxy server, using the description in the WADL file of the set of resources provided by the second web service.

16. A system comprising:
a processing unit comprising one or more processors; and
memory coupled with and readable by the processing unit and storing therein a set of instructions which, when executed by the processing unit, causes the processing unit to:
receive a web service request from a client device in an external computer network, wherein the system is configured to operate within a subnetwork of an internal computer network separate from the external computer network;
identify a first resource within the web service request;
determine whether the first resource is exposed by a first Representational State Transfer (REST) web service within the system;
invoke the first REST web service within the system, in response to determining that the first resource is exposed by the first REST web service; and
during execution of the first REST web service within the system, invoke a second web service within a computer server in the internal computer network, wherein the second web service is a REST web service within the computer server in the internal computer network,
wherein the first REST web service within the system exposes a plurality of resources, including at least one resource configured to invoke the second REST web service, and including at least one resource configured to invoke a third REST web service exposed by a different computer server in the internal computer network.

17. The system of claim 16, wherein invoking the first REST web service within the system comprises:
determining that the first resource exposed by the first REST web service does not exist within the memory of the system; and
generating the first resource within the memory of the system, wherein the first resource is generated after the web service request is received from the client device.

18. The system of claim 16, the memory storing therein further instructions which, when executed by the processing unit, causes the processing unit to:
access a Web Application Description Language (WADL) file describing a set of resources provided by the second web service within the computer server in the internal computer network; and
generate one or more resources in the first REST web service within the system, using the description in the WADL file of the set of resources provided by the second web service.

19. A method of transmitting web service requests between computer networks, the method comprising:
receiving, at a proxy server in communication with an internal computer network, a web service request from a client device in an external computer network separate from the internal computer network;
identifying a first resource within the web service request;
determining whether the first resource is exposed by a first Representational State Transfer (REST) web service within the proxy server;
in response to determining that the first resource is exposed by the first REST web service, invoking the first REST web service within the proxy server; and
during execution of the first REST web service within the proxy server, invoking a second web service within a computer server in the internal computer network, wherein the second web service is a REST web service within the computer server in the internal computer network,
wherein the second REST web service exposes a plurality of resources, and wherein the first REST web service within the proxy server exposes a subset of the plurality of resources exposed by the second REST web service.

20. The method of claim 19, wherein invoking the first REST web service within the proxy server comprises:
determining that the first resource exposed by the first REST web service does not exist within the proxy server; and
generating the first resource within the proxy server, wherein the first resource is generated after the web service request is received from the client device.

21. The method of claim 19, further comprising:
accessing a Web Application Description Language (WADL) file describing a set of resources provided by the second web service within the computer server in the internal computer network; and generating one or more resources in the first REST web service within the proxy server, using the description in the WADL file of the set of resources provided by the second web service.

22. A system comprising:

a processing unit comprising one or more processors; and memory coupled with and readable by the processing unit and storing therein a set of instructions which, when executed by the processing unit, causes the processing unit to:

receive a web service request from a client device in an external computer network, wherein the system is configured to operate within a subnetwork of an internal computer network separate from the external computer network;

identify a first resource within the web service request;

determine whether the first resource is exposed by a first Representational State Transfer (REST) web service within the system;

invoke the first REST web service within the system, in response to determining that the first resource is exposed by the first REST web service; and during execution of the first REST web service within the system, invoke a second web service within a computer server in the internal computer network, wherein the second web service is a REST web service within the computer server in the internal computer network, wherein the second REST web service exposes a plurality of resources, and wherein the first REST web service within the proxy server exposes a subset of the plurality of resources exposed by the second REST web service.

23. The system of claim 22, wherein invoking the first REST web service within the system comprises:

determining that the first resource exposed by the first REST web service does not exist within the memory of the system; and generating the first resource within the memory of the system, wherein the first resource is generated after the web service request is received from the client device.

24. The system of claim 22, the memory storing therein further instructions which, when executed by the processing unit, causes the processing unit to:

access a Web Application Description Language (WADL) file describing a set of resources provided by the second web service within the computer server in the internal computer network; and generate one or more resources in the first REST web service within the system, using the description in the WADL file of the set of resources provided by the second web service.

25. A method of transmitting web service requests between computer networks, the method comprising:

receiving, at a proxy server in communication with an internal computer network, a web service request from a client device in an external computer network separate from the internal computer network;

determining a current point in a predetermined processing flow for the web service request within the proxy server;

retrieving one or more security policies, based on the determined current point in the predetermined processing flow for the web service request;

processing the web service request in accordance with the security policies;

identifying a first resource within the web service request;

determining whether the first resource is exposed by a first Representational State Transfer (REST) web service within the proxy server;

in response to determining that the first resource is exposed by the first REST web service, invoking the first REST web service within the proxy server; and during execution of the first REST web service within the proxy server, invoking a second web service within a computer server in the internal computer network, wherein the web service request is processed before invoking the second web service exposed by the computer server in the internal computer network.

26. The method of claim 25, wherein invoking the first REST web service within the proxy server comprises:

determining that the first resource exposed by the first REST web service does not exist within the proxy server; and generating the first resource within the proxy server, wherein the first resource is generated after the web service request is received from the client device.

27. The method of claim 25, wherein the second web service is a Simple Object Access protocol (SOAP) web service within the computer server in the internal computer network.

28. A system comprising:

a processing unit comprising one or more processors; and memory coupled with and readable by the processing unit and storing therein a set of instructions which, when executed by the processing unit, causes the processing unit to:

receive a web service request from a client device in an external computer network, wherein the system is configured to operate within a subnetwork of an internal computer network separate from the external computer network;

determine a current point in a predetermined processing flow for the web service request within the system;

retrieve one or more security policies, based on the determined current point in the predetermined processing flow for the web service request;

process the web service request in accordance with the security policies;

identify a first resource within the web service request;

determine whether the first resource is exposed by a first Representational State Transfer (REST) web service within the system;

invoke the first REST web service within the system, in response to determining that the first resource is exposed by the first REST web service;

during execution of the first REST web service within the system, invoke a second web service within a computer server in the internal computer network, wherein the web service request is processed before invoking the second web service exposed by the computer server in the internal computer network.

29. The system of claim 28, wherein invoking the first REST web service within the system comprises:

determining that the first resource exposed by the first REST web service does not exist within the memory of the system; and generating the first resource within the memory of the system, wherein the first resource is generated after the web service request is received from the client device.

30. The system of claim 28, wherein the second web service is a Simple Object Access protocol (SOAP) web service within the computer server in the internal computer network.

* * * * *

UNITED STATES PATENT AND TRADEMARK OFFICE
CERTIFICATE OF CORRECTION

PATENT NO. : 9,648,043 B2  
APPLICATION NO. : 14/696432  
DATED : May 9, 2017  
INVENTOR(S) : Handa et al.

Page 1 of 1

It is certified that error appears in the above-identified patent and that said Letters Patent is hereby corrected as shown below:

In the Specification

In Column 5, Line 40, delete "infra-red" and insert -- infrared --, therefor.

In Column 22, Line 8, after "8" insert -- . --.

In Column 24, Line 57, delete "FIG. 4A-4B" and insert -- FIGS. 4A-4B --, therefor.

In Column 27, Line 50, delete "FIG. 4A-4B" and insert -- FIGS. 4A-4B --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*